April 4, 1961
J. C. FISK
2,977,889
FLUID PRESSURE POWER CONVERTER
Filed Feb. 11, 1957
10 Sheets-Sheet 2
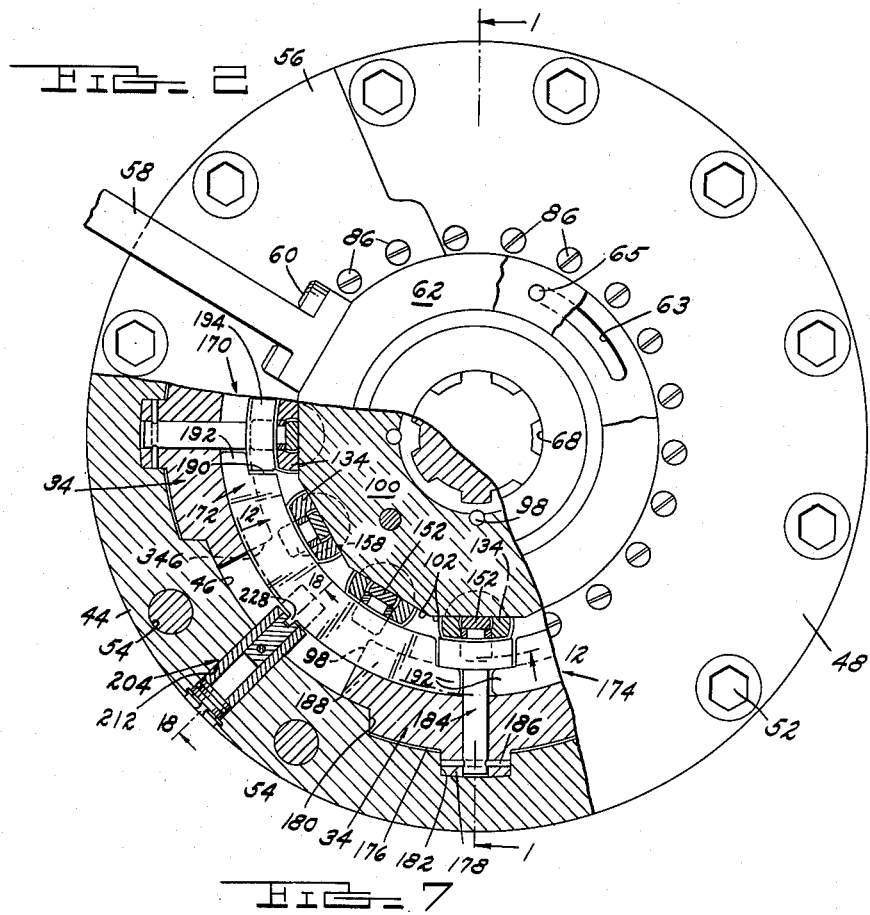
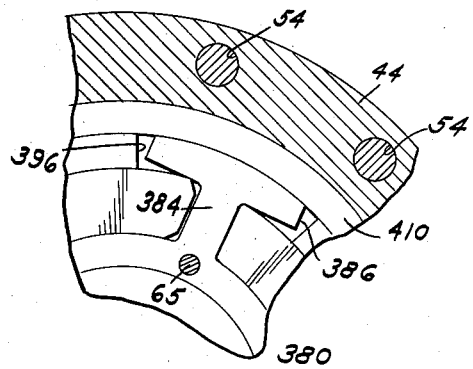
INVENTOR.
JAMES C. FISK
BY
Burton & Parker
ATTORNEYS

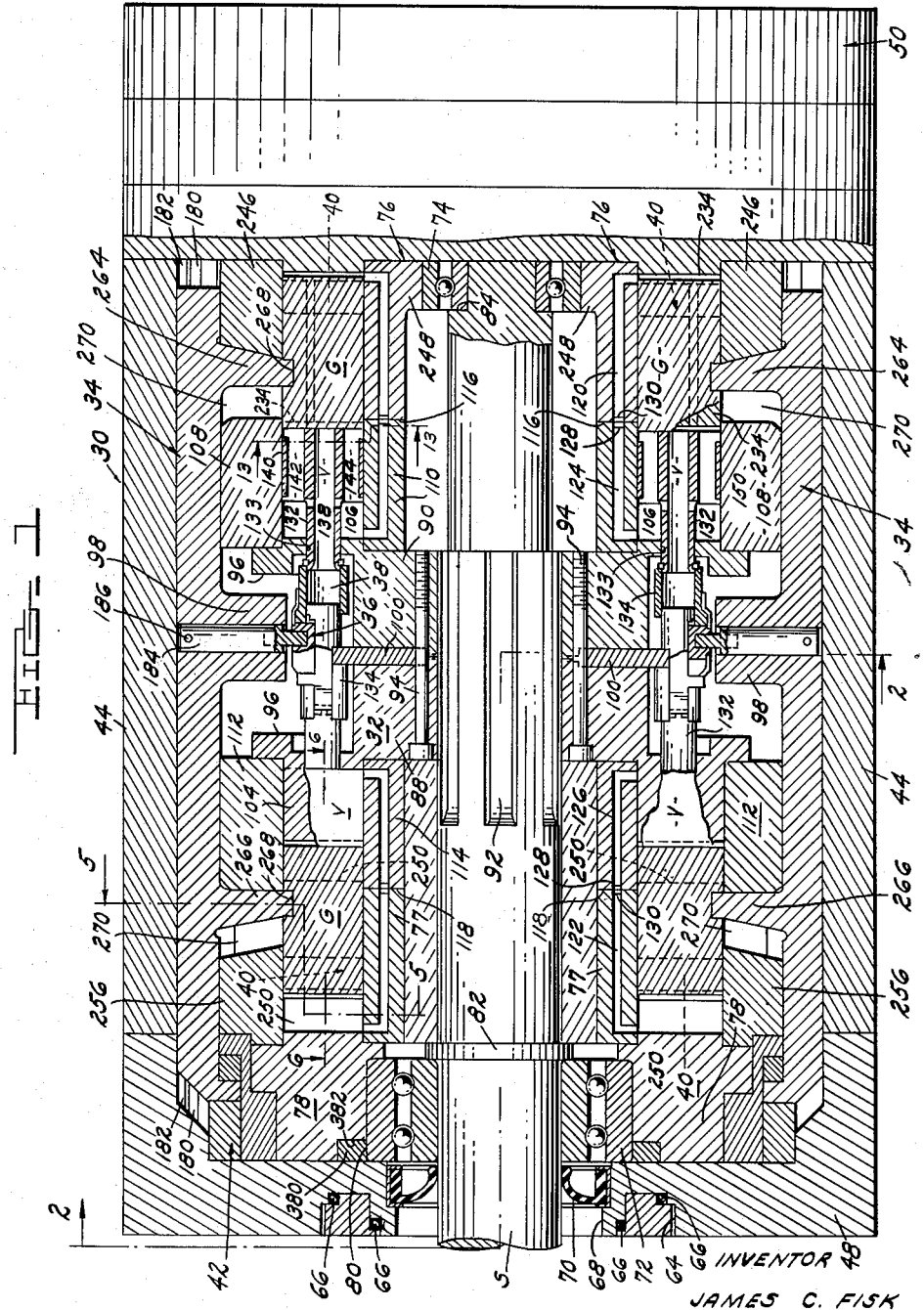

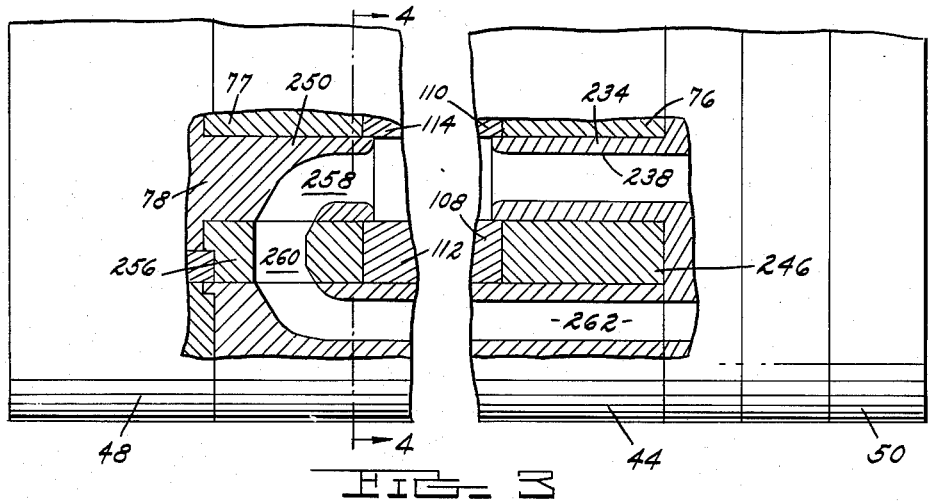
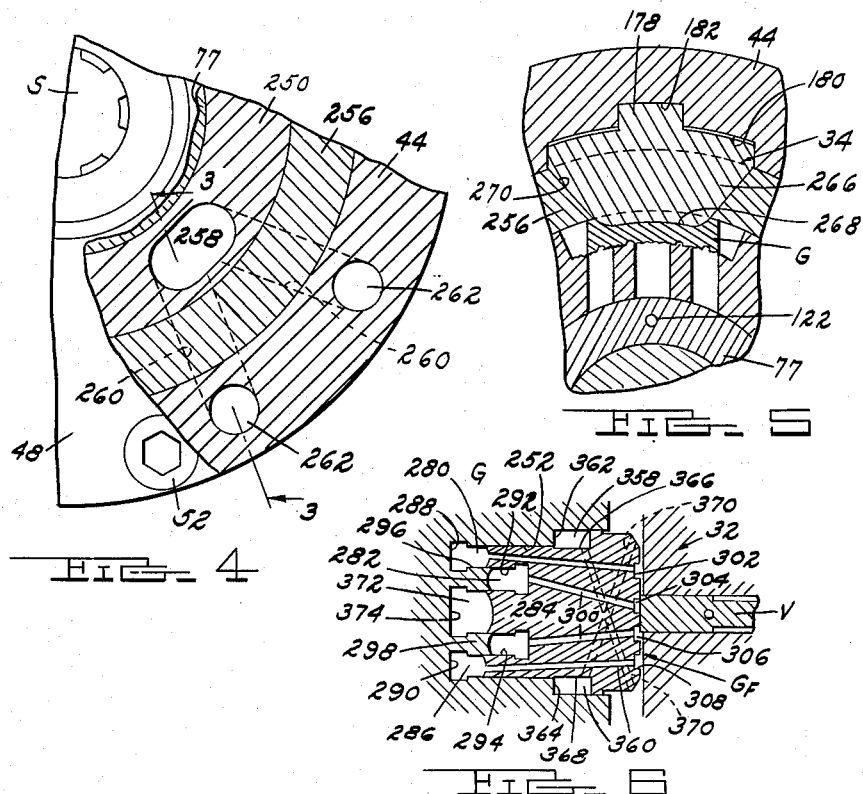

April 4, 1961 J. C. FISK 2,977,889
FLUID PRESSURE POWER CONVERTER
Filed Feb. 11, 1957 10 Sheets-Sheet 4
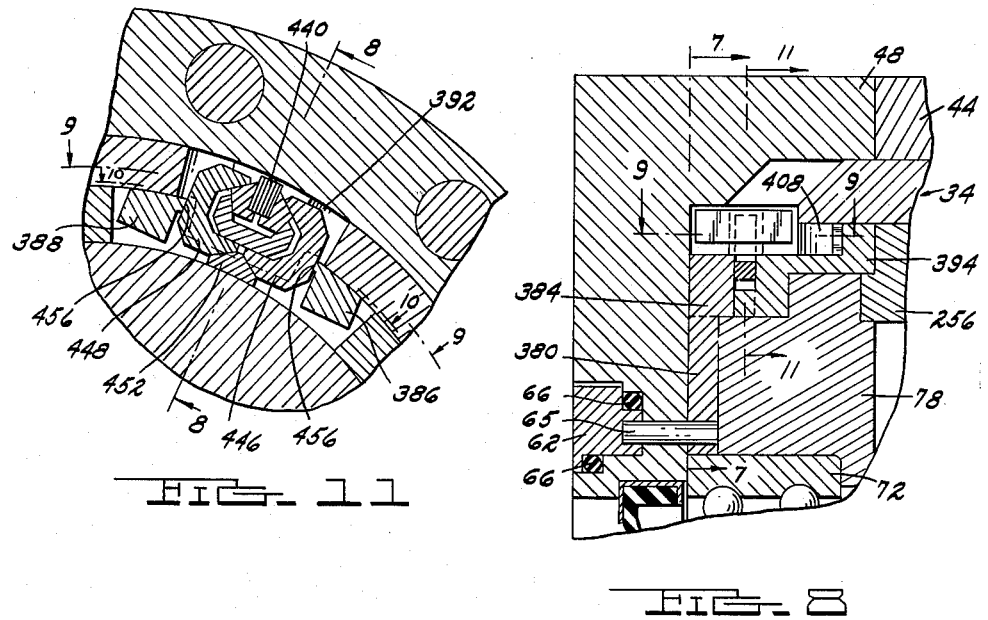
FIG. 11
FIG. 8
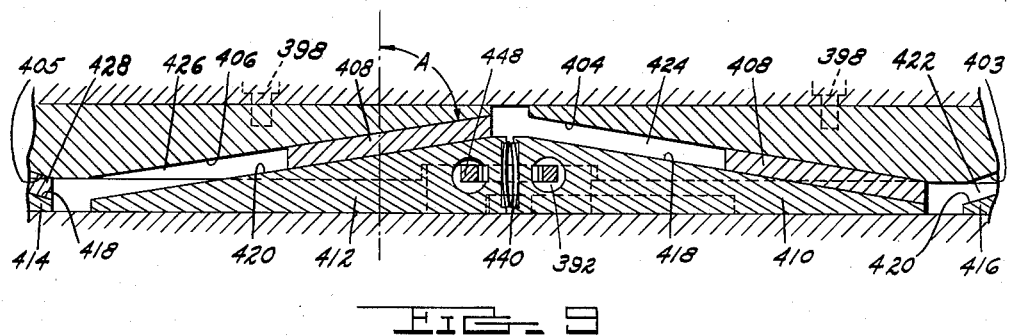
FIG. 9
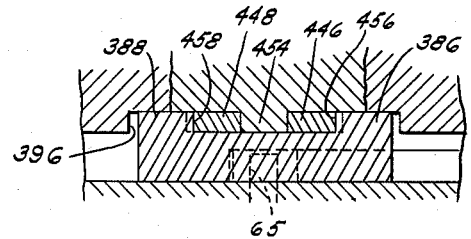
FIG. 10
INVENTOR.
JAMES C. FISK
BY
Burton & Parker
ATTORNEYS

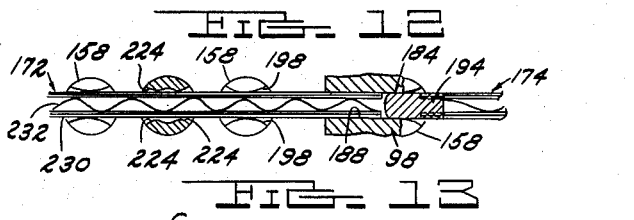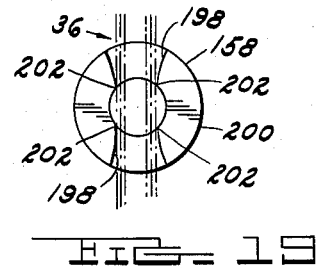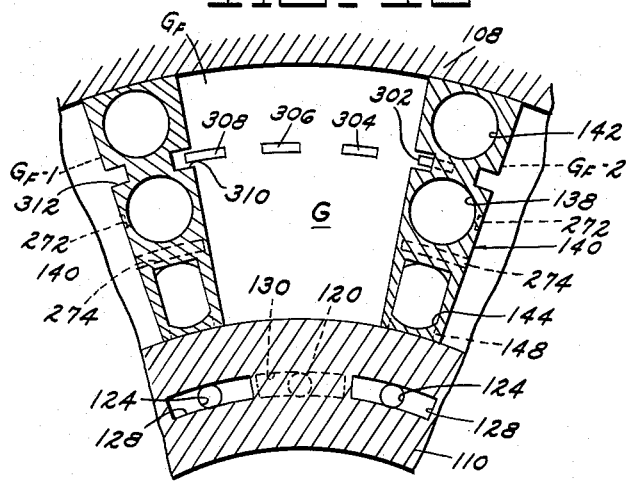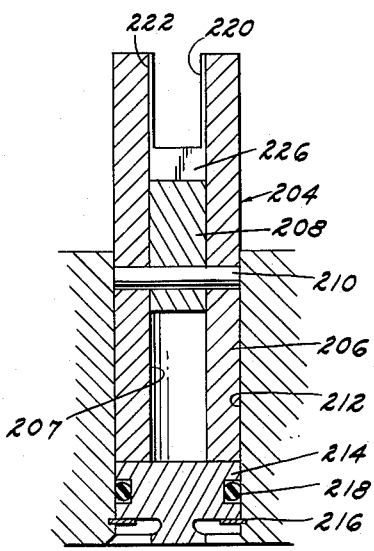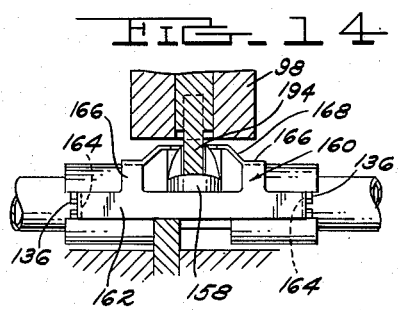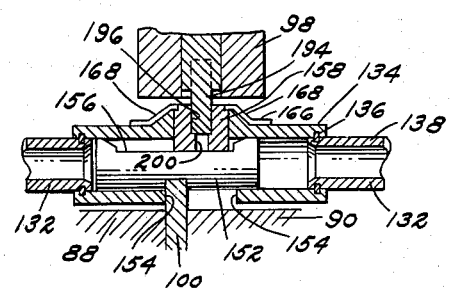

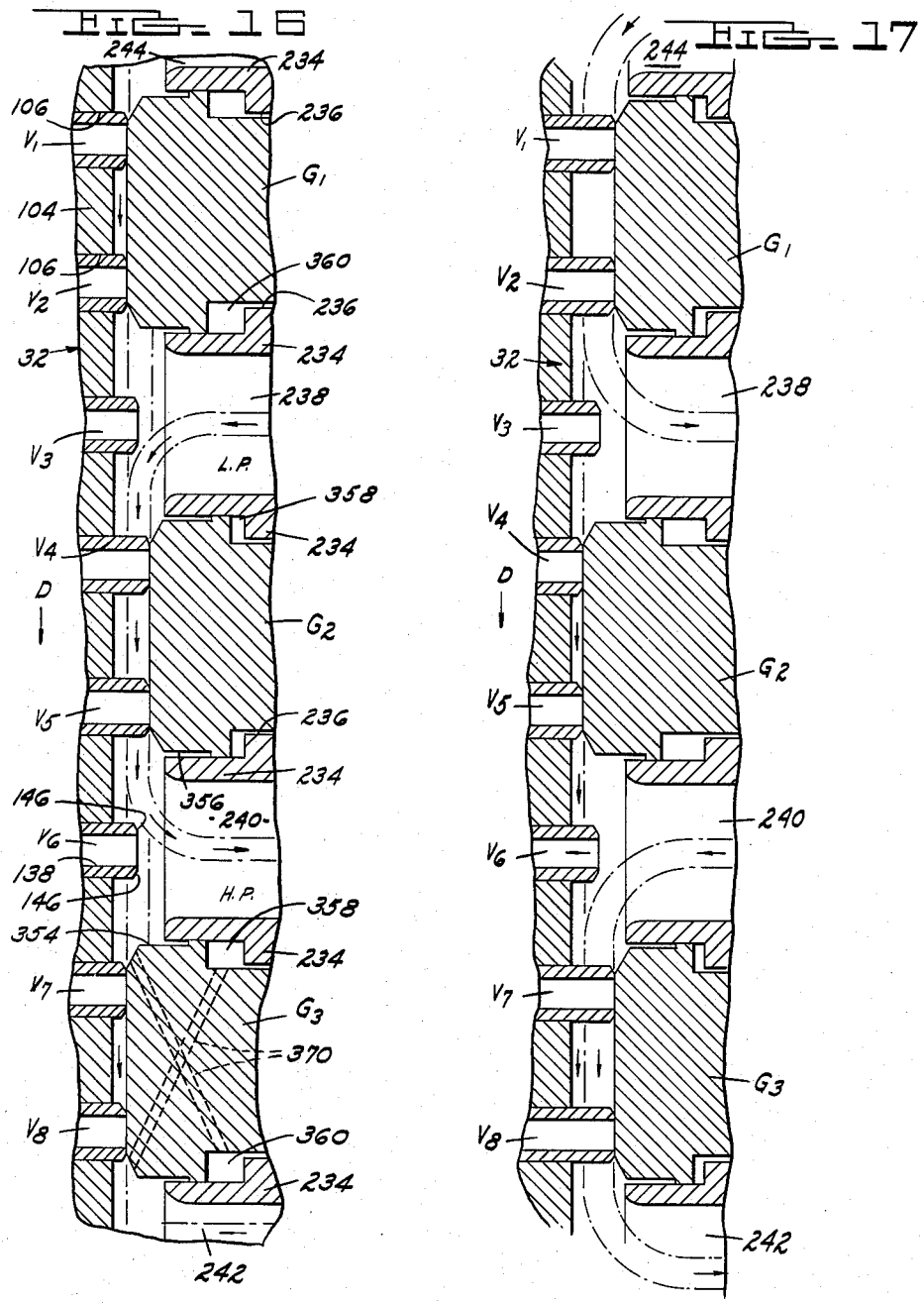

April 4, 1961  J. C. FISK  2,977,889
FLUID PRESSURE POWER CONVERTER
Filed Feb. 11, 1957  10 Sheets-Sheet 7
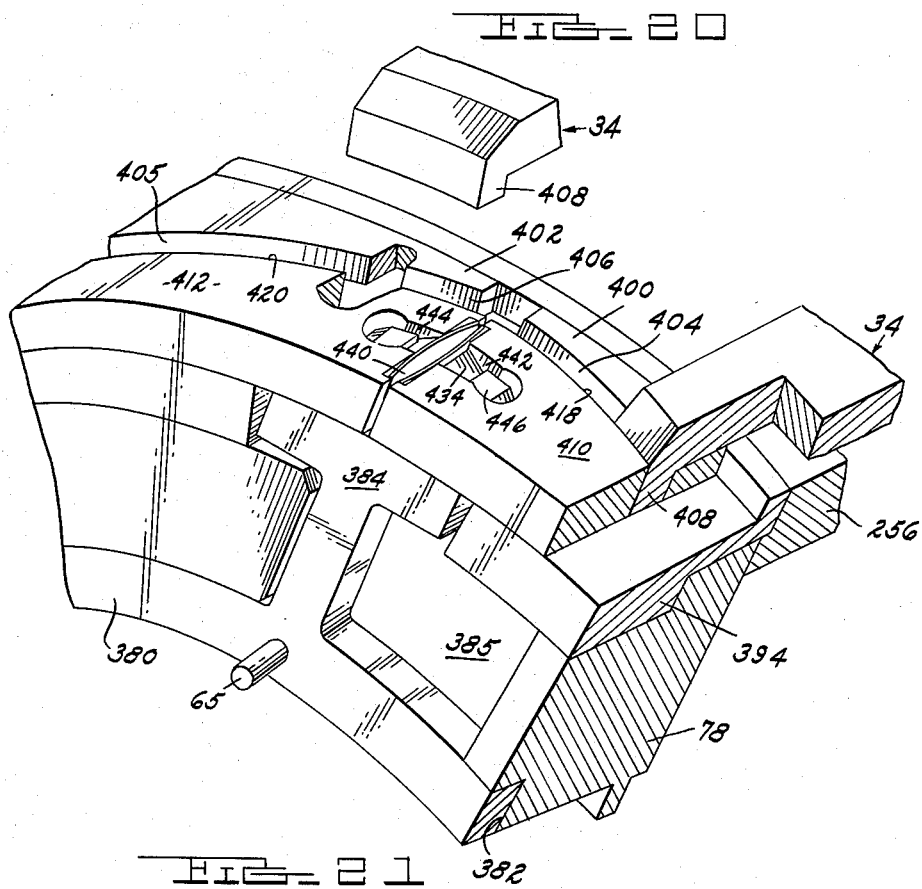
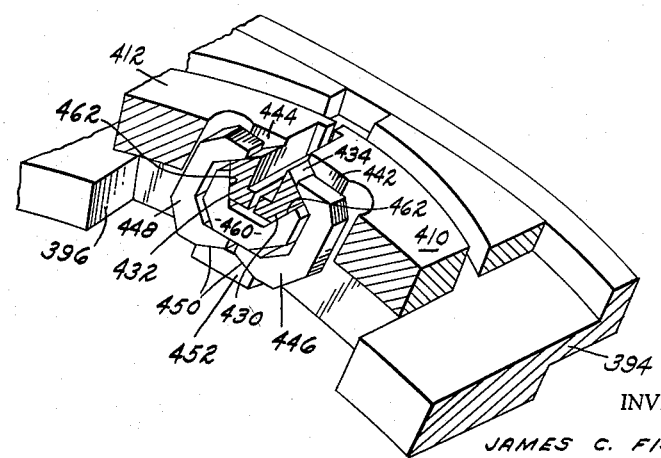
INVENTOR.
JAMES C. FISK
BY Burton & Parker
ATTORNEYS April 4, 1961  J. C. FISK  2,977,889
FLUID PRESSURE POWER CONVERTER
Filed Feb. 11, 1957  10 Sheets-Sheet 8
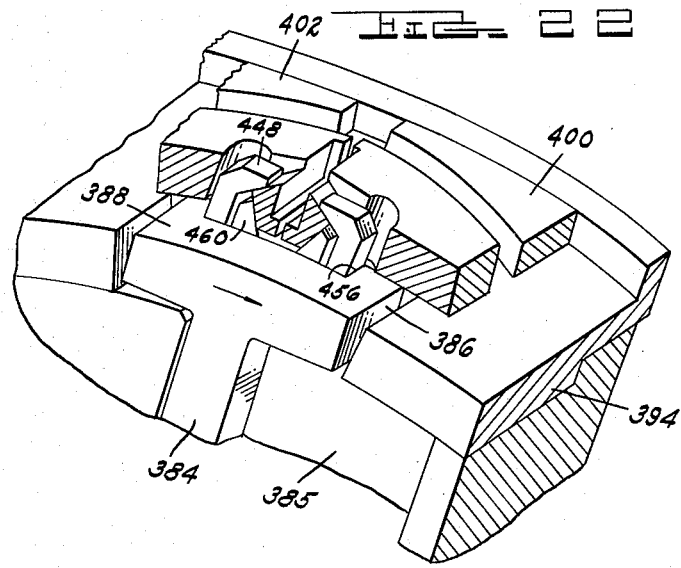
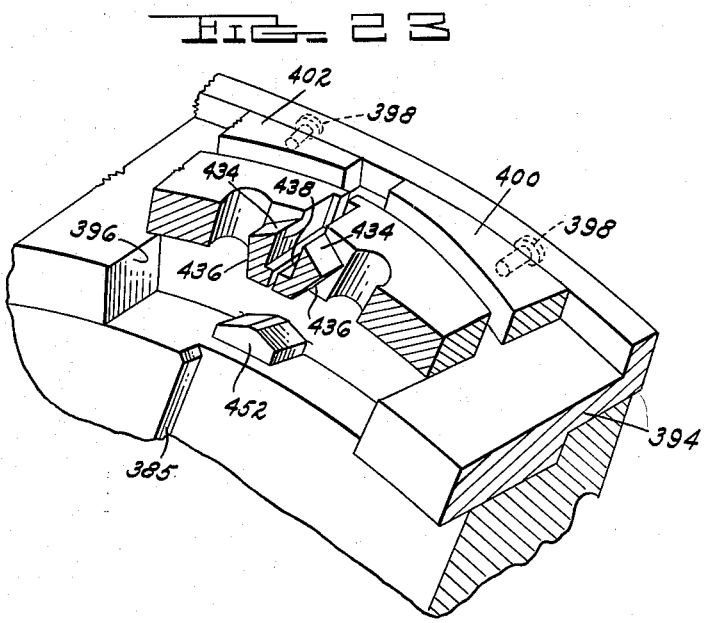
INVENTOR.
JAMES C. FISK
BY
Burton E Parker
ATTORNEYS

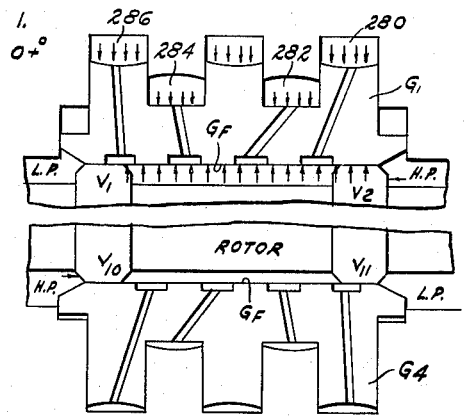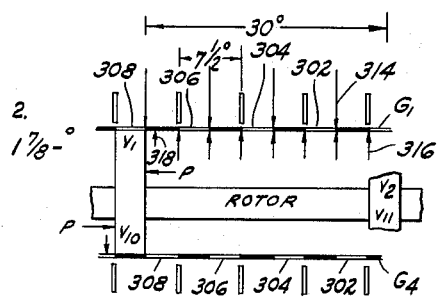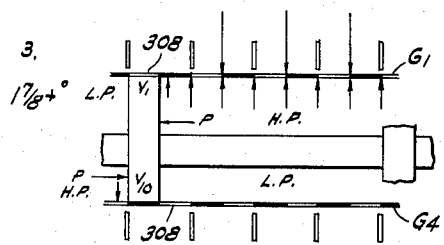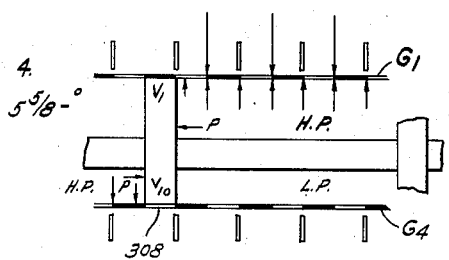
FIG. 24

April 4, 1961    J. C. FISK    2,977,889
FLUID PRESSURE POWER CONVERTER
Filed Feb. 11, 1957    10 Sheets-Sheet 10
5
5⅝+°
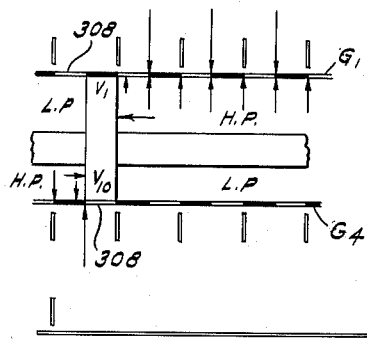
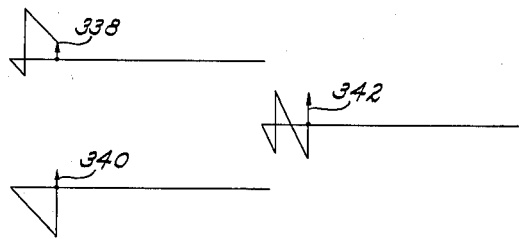
6
5⅝+° TO 28⅛-°
7
28⅛+°
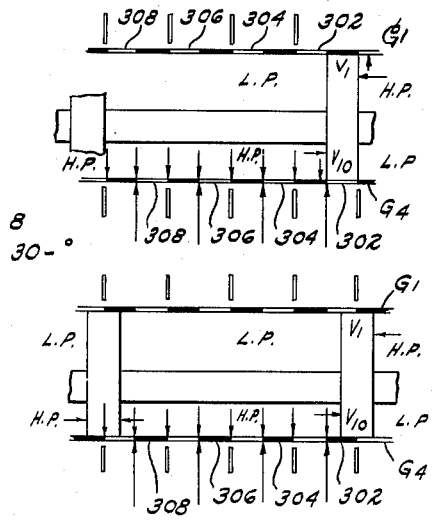
8
30-°
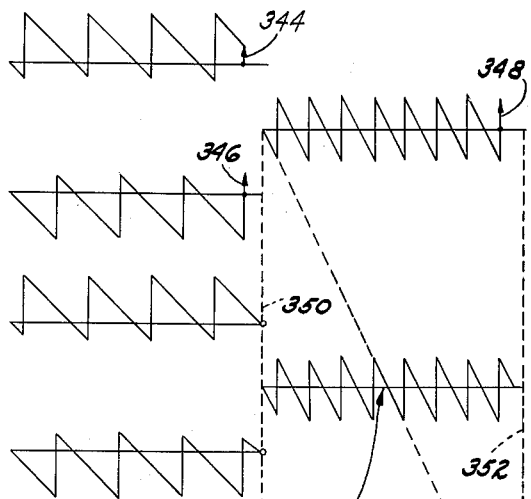
FORCE PATTERN WITHOUT
COUNTER BALANCE GATES
RE. THIS AXIS.
FIG. 25
INVENTOR.
JAMES C. FISK
BY
Burton & Parker
ATTORNEYS

United States Patent Office 2,977,889
Patented Apr. 4, 1961

2,977,889

FLUID PRESSURE POWER CONVERTER

James C. Fisk, % Fisk Tool Co., 3301 E. Court St., Flint, Mich.

Filed Feb. 11, 1957, Ser. No. 639,450

20 Claims. (Cl. 103—120)

This invention relates to an axially shiftable vane fluid pressure power converter, the power conversion factor of which may be readily varied. For convenience I will refer to the converter as a pump.

The conventional pumps, in widespread use, wherein a plurality of vanes are carried by a rotor within a pumping chamber with the vanes shiftable in the rotor, universally effect the pumping action by shifting the vanes radially of the axis of rotation of the rotor. One of the primary reasons for failure of axially shiftable vane pumps to attain any noticeable commercial success has been the problem of vane wear caused by friction between the vanes and pumping chamber walls. In my copending application Serial No. 588,713, filed June 1, 1956, I have disclosed a solution for this problem. In the instant disclosure, which relates to a variable displacement pump, i.e., a pump whose power conversion factor may be varied, I have retained the same general approach to the solution of the problem though, because of the difference in the nature of a variable displacement pump over a fixed displacement pump certain unique adaptations of the solution of this problem arise in the herein disclosed pump.

A primary object of the invention is the provision of a variable displacement axially shiftable vane pump which retains the advantageous features of the invention disclosed in my aforesaid application. A concomitant object is the adaptation of the vane counterbalancing feature disclosed in said application to the vanes of the pump herein disclosed, whereby the vane shifting means may be of simple design and easily controlled to sensitively vary the pump displacement.

Another object of the invention is the provision of vane shifting means which is of simple construction and accurately controls the reciprocation of the vanes and is readily adjusted to vary the length of the reciprocal strokes of the vanes.

To vary the displacement of an axially shiftable vane pump, the length of stroke of the vanes is varied as well as the position of the gates at the end of the rotor chamber over the faces of which the vanes sweep. With oppositely extending vanes connected in pairs to shift coaxially as a unit, and with each vane being counterbalanced, and with the counterbalancing means for the vanes of each pair being hydraulically isolated from each other, a vane in working phase causes a hydraulic block preventing adjustment of the stroke of the vane unit to vary the discharge of the pump. Therefore another object of the invention is the provision of means associated with the vane counterbalancing means which will permit varying the stroke of a vane when in working phase.

With high fluid pressures in the pump acting against the gate faces, rather massive control means and a substantial controlling force would be necessary in order to shift the positions of the gates; and with massive control means and large control forces, accurate sensitive control is difficult. Therefore another primary object of the invention is the provision of fluid pressure counterbalance means acting upon the gates to counterbalance the thrust upon them by the high fluid pressures acting against their faces, so that the gates may be shifted with a minimum of effort by relatively small control means thereby gaining substantial accuracy of fluid control.

In the disclosed embodiment of the pump, the vanes project from opposite ends of the rotor, with shiftable gates at opposite ends of the rotor chamber. Each pair of oppositely extending vanes are connected together to shift as a unit and opposed gates at opposite ends of the rotor chamber are connected together to be displaced in accordance with the amplitude of vane reciprocation. Because the fluid pressure thrusts on the faces of connected pairs of gates are alternating in character, as hereinafter more particularly explained, the forces on the control means for varying the gate displacement are alternating in character. My approach to reducing these forces to a minimum so that massive control means is not required is to vastly decrease their intensity by dividing up the force impulses into a much greater number of impulses of correspondingly lesser intensity and counterbalancing these smaller forces.

Another object of the invention is the provision of anti-backlash mechanism associated with the gate position control means which prevents any flutter of the gates caused by the unbalanced forces acting on the gates during those intervals between the balanced impulses.

Another object of the invention is the provision of a completely reversible flow axially shiftable vane pump in which the flow in either direction is variable from a maximum to zero.

Another object of the invention is the provision of a two-cycle variable displacement, axially shiftable vane pump. A concomitant object is the provision of a static, flexible cam ring assembly for shifting the vanes and allowing controlled variations in their strokes.

Yet a further object is the provision of a pump of the character mentioned which is as well suited for use as a fluid motor.

A further object of the invention is the provision of a pump or motor of the character mentioned which is of highly efficient operation and of smooth performance.

Other objects, advantages, and meritorious features will more fully appear from the specification, claims, and accompanying drawing, wherein:

Fig. 1 (sheet 1) is a cutaway side view through a pump embodying my invention taken substantially along the line 1—1 of Fig. 2;

Fig. 2 (sheet 2) is an end view of the pump shown in Fig. 1 partially cut away along substantially the line 2—2 of Fig. 1;

Fig. 3 (sheet 3) is a fragmentary cross sectional view through passageways in the pump and showing the relative positions of the passageways in relation to certain parts of the pump;

Fig. 4 (sheet 3) is a cross sectional view taken substantially on the line 4—4 of Fig. 3;

Fig. 5 (sheet 3) is a fragmentary cross sectional view taken along the line 5—5 of Fig. 1 through the connection of an overarm with one of the gates;

Fig. 6 (sheet 3) is a fragmentary cross sectional view taken substantially along the line 6—6 of Fig. 1;

Fig. 7 (sheet 2) is a fragmentary view taken substantially along the line 7—7 of Fig. 8 and showing a portion of the gate position control means;

Fig. 8 (sheet 4) is a fragmentary cross sectional view through the gate position control means;

Fig. 9 (sheet 4) is a fragmentary cross sectional view taken on the line 9—9 of Fig. 8 or 11;

Fig. 10 (sheet 4) is a fragmentary cross sectional view taken substantially along the line 10—10 of Fig. 11 showing a portion of the gate position control means of Fig. 8;

Fig. 11 (sheet 4) is a fragmentary cross sectional view taken substantially along the line 11—11 of Fig. 8;

Fig. 12 (sheet 5) is a fragmentary cross sectional view taken substantially along the arcuate sectional line 12—12 of Fig. 2;

Fig. 13 (sheet 5) is a fragmentary cross sectional view taken substantially on the line 13—13 of Fig. 1;

Fig. 14 (sheet 5) is a side view partially in section at the connection of one of the overarms with vane shift camming means, and the connection of the latter with the vanes;

Fig. 15 (sheet 5) is a cross sectional view taken along a vertical plane passing through the axis of the opposed vane shanks shown in Fig. 14;

Fig. 16 (sheet 6) is a flattened, substantially 180° fragmentary cylindric section of revolution through some of the gates and vanes illustrating their cooperation in effecting motor or pumping functions;

Fig. 17 (sheet 6) is a view similar to that of Fig. 16 but showing the gates shifted to reverse the flow discharge of the pump;

Fig. 18 (sheet 5) is a cross sectional view through a cam retainer pin taken along the line 18—18 of Fig. 2;

Fig. 19 (sheet 5) is an enlarged view of one of the cam followers shown in Fig. 12;

Fig. 20 (sheet 7) is a perspective view, with certain parts removed for clarity, of two of the control cam rings, associated overarms and anti-backlash means;

Fig. 21 (sheet 7) is a perspective view of a portion of the anti-backlash means shown in Fig. 20;

Fig. 22 (sheet 8) is another perspective view with parts broken away for clarity of the structure of Fig. 20;

Fig. 23 (sheet 8) is another perspective view with parts broken away for clarity of the structure of Fig. 20;

Figs. 24 and 25 (sheets 9 and 10) show a vectorial analysis of hydraulic forces acting on a pair of companion working and blocking gates at opposite ends of the pumping chamber during the passage thereover of a pair of companion vanes.

General construction

In general, my power converter or pump comprises, as shown in Fig. 1, cooperating stator and rotor members 30 and 32 respectively. The stator includes a rotor housing defining a rotor chamber in which the rotor is mounted on shaft S for rotation on the axis of the chamber. One of such members is provided with a plurality of vanes and the other with a plurality of gates. In this illustrative embodiment the rotor is provided with twelve circumaxially spaced-apart oppositely extending connected pairs of vanes V adapted to sweep the faces of four opposed pairs of circumaxially arranged axially shiftable blocking and working gates G disposed in opposite ends of the rotor chamber. The gates at each end of the rotor chamber are circularly spaced apart 90°. By varying the distance of the gates from the rotor and correspondingly varying the limits of shiftable movement of the vanes, the displacement or discharge of the pump may be varied. The representative embodiment of the invention herein described is a two-cycle pump, viz: upon each revolution of the pump shaft, each vane of the pump performs two pumping functions.

Mechanism is provided for shifting the vanes during angular travel between the gates and accurately coordinating movement of opposed gates at opposite ends of the rotor chamber while correspondingly varying the stroke of the vanes in relation to the positions of the gates. By shifting the positions of the gates and correspondingly varying the length of stroke of the vanes, the displacement or what may be termed power conversion factor of the converter may be varied. Such mechanism includes a plurality of overarms 34 extending axially of the rotor chamber with one connected to each pair of opposed gates and with each overarm connected to vane-shifting camming means 36. Circumaxially alternate overarms are simultaneously displaced equal amounts in opposite directions to vary the capacity of the pump. Hydraulic counterbalancing means 38 are associated with the vanes, and hydraulic counterbalancing means 40 are associated with the gates, with both counterbalancing means operative to oppose high fluid pressures in the rotor chamber reacting against the vanes and gates and tending to urge the vanes inwardly of the rotor and the gates outwardly of the rotor chamber. Such hydraulic counterbalancing means facilitates shifting of the vanes and gates, to vary the pump displacement, with a minimum of effort despite high fluid pressures in the pump. Gate position and vane reciprocation control means forming a part of said mechanism is provided at 42 to synchronously shift the overarms 34.

The illustrative embodiment of the pump comprises five major assemblies: the stator, the rotor including the vanes, the vane-shifting means, the gate assembly, and the gate position and vane reciprocation control means. These assemblies will be considered in the above order hereinbelow.

Stator

The stator or housing 30 includes a central portion 44 which may be of any suitable exterior shape, while the interior defines a cylindrical bore 46 as shown in Fig. 2. Opposite ends of the center portion 44 are closed by end wall portions 48 and 50 each of which is secured to the center portion as by bolts 52 threaded into provided bores 54 in the center portion as shown in connection with end wall 48 in Fig. 2. End wall or closure plate 48 is provided in the outer surface with a relieved portion 56 as shown in Fig. 2 to permit swingable movement of the displacement or flow control handle 58 in the plane of the plate. The handle is mounted by bolts or the like 60 on a ring 62 which is received in an annular channel 64 formed in plate 48 as shown in Fig. 1. An arcuate slot 63 extending through plate 48 and opening through the bottom of channel 64 permits pin 65, connected to ring 62, to extend through the plate for connection to mechanism for controlling the rate of discharge or displacement of the pump. O-ring seals 66 prevent the escape of fluid outwardly around the ring.

An aperture 68 in plate 48, coaxial with the axis of the rotor chamber, admits passage of pump shaft S through the end plate. Suitable sealing means 70 in the aperture prevents escape of fluid from the pump around the shaft. Anti-friction bearing assemblies 72 and 74 at opposite ends of the rotor chamber support the shaft S in the housing for rotation on the axis of the rotor chamber. The bearing assembly 74 is received within an inner gate ring 76, hereinafter described, which supports the bearing. Another inner gate ring 77 at the opposite end of the rotor chamber is also provided. Bearing asembly 72 is supported and held against end plate 48 by the annular encircling gate receptacle 78, hereinafter more fully described, having a land 80 overlying the marginal edge of the inner face of the bearing assembly. End 82 and shoulder 84 on shaft S abut the bearing assemblies to axially position the shaft. Gate receptacle 78 is secured to end wall 48 by bolts 86 shown in Fig. 2.

Rotor assembly

The rotor assembly 32 includes a pair of annular elements 88 and 90 disposed in back-to-back relation and fitted over the splines 92 of the rotor shaft S and held together by means of suitable bolts or the like 94, as shown in Fig. 1. Each of the elements 88 and 90 is cut away as at 96 at their peripheries to provide cooperating recesses into which extend the central inwardly projecting ear 98 of each overarm 34 of the gate-positioning means to cooperate with the vane-shifting means 36. Disposed between the meeting surfaces of elements 88 and 90 is a dodecagonal plate 100 having edges 102 as shown in Fig. 2. The edges of the plate are received in locking engagement with a portion of the vane-shifting means to hold such portion of the vane-shifting means against axially shiftable movement. The center of the plate is apertured to receive rotor shaft S therethrough.

Each element 88 and 90 is also provided adjacent the marginal outer edge with an annular rib 104, as shown in Fig. 1, within which at angularly spaced-apart intervals of 30° are cut vane-receiving notches indicated in Figs. 1 and 16 at 106. The notches extend radially completely through the ribs. Lying at the inside and at the outside of the rotor ribs are inner and outer rotor rings which block off the open sides of the vane-receiving notches to form chambers within which the vanes V are received. The rotor rings at the right-hand side of the rotor, as viewed in Fig. 1, are indicated at 108 and 110, while the rotor rings at the left-hand side of the rotor are indicated at 112 and 114. The rotor rings may be snugly received on opposite sides of the rotor ribs to rotate with the ribs. The outer edges of the inner rotor rings 110 and 114 abut the opposed edges of the inner gate rings 76 and 77 to form sliding interfaces 116 and 118.

The inner gate rings 76 and 77 are provided at circularly spaced-apart intervals with passages 120 and 122 which open at one end into the displacement chambers behind the gates G as hereinafter described, and communicate periodically at the other end through the interfaces 116 and 118 with angularly spaced passages 124 and 126 in the inner rotor rings 110 and 114. Passages 124 and 126, of which there is one for each vane-receiving notch 106, communicate with the notches as shown in Fig. 1. At the interfaces 116 and 118 the passageways 122 and 126, and 120 and 124, may be provided with cooperating slots 128 and 130 which cooperate to form ports for the transmission of fluid pressure between passages. The passages 124 and their slots 128 are shown in Fig. 13 as well as in Fig. 1. The purpose of passages 120, 122, 124, and 126 is to facilitate the shifting of the gates to vary the fluid discharge of the pump. The necessity for and further description of the passages will be discussed hereinafter.

Each of the vanes V is provided, as shown in Fig. 1, with a vane shank 132 which extends through an aperture 133 opening at one end through the bottom of vane notches 106 and at the other end through the cutout portions 96 in the periphery of the rotor elements. The apertures 133 in rotor elements 88 and 90 are in axial alignment, and one vane shank extends through each aperture providing pairs of coaxially aligned vanes disposed at circumaxially spaced-apart intervals of 30° and extending in opposite directions out of the rotor. The inner ends of each pair of companion vane shanks are connected, as shown in Figs. 1 and 15, to opposite ends of a vane-counterbalancing cylinder 134 by any suitable means such as snap rings 136. Each of the shanks is provided with a bore 138 which extends axially therethrough and opens through the end of the vane at the face which sweeps the gates G. Each vane shank is provided with a head portion 140, shaped as shown in Figs. 1 and 13, and closely fitting the vane-receiving notches 106 in the rotor ribs 104. In addition to the bore 138 which extends through the head, two other passages 142 and 144 extend axially through the head. These passages open at the rear of the head into the vane cavities 106 in the rotor ribs. The outer end of each vane, or vane face, is beveled as at 146 on each side, as shown in Fig. 16. In order to provide passage 144 of uniform cross-sectional area and still provide sufficient strength, the passage may open through the vane face in a rectangular port 148, which opens through the bottom as well as the end of the vanes. Small bypass apertures 150 in each vane shank permit distribution of fluid pressure from the vane passage 138 to the vane-receiving cavity 106 behind the vane head.

Disposed within each of the cylinders 134 is a piston 152 which is provided with a transverse slot into which an edge 102 of the dodecagonal plate 100 is received to lock the piston against axially shiftable movement. The wall of the cylinder 134 is cut away as at 154 to permit the entry of the plate 100, and axial shifting of the cylinder 134 and its associated pair of vanes relative to the piston while the piston remains stationary.

The upper surface of the piston is cut away as at 156 to permit a swivel cam follower 158, received through the wall of the cylinder 134, to extend into the chamber formed by the cylinder. The cam follower may be held in place by means of a clamp 160 shown in Fig. 14. The follower is freely rotatable upon its axis. The clamp is provided with a pair of parallel arms 162 which extend along opposite sides of the cylinder and which are provided at opposite ends with ears 164 which extend into cavities formed in the side walls of the cylinder. Bands 166 extend over the top of the cylinder between arms 162 to tie the arms together. An arm 168 extends between the bands and overlies the top of the follower 158. The arm 168 is constructed such that a chamfer in the top of the follower snugly fits the arm, as shown in Fig. 15.

It is now apparent that by means of cylinder 134 oppositely extending pairs of vanes are connected together, and that by virtue of piston 152 the vanes are hydraulically isolated from each other. Furthermore, fluid pressure at one end of the rotor is isolated from fluid pressure at the other end of the rotor, except for the passages 238, 258, 240, 242, and 244, which serve only to admit to, or discharge fluid pressure from, the rotor chamber in association with the fluid pressure system in which the pump is connected.

*Vane shifting means*

The vanes are shifted axially of the rotor by means of a camming arrangement 36 which encircles the rotor and which is adjustable to vary the limits of shiftable movement of the vanes. Such camming means comprises a plurality of arcuately shaped laterally flexible ring sectors which are disposed in end-to-end relation to form a flexible cam ring structure around the rotor. The cam follower 158 of each vane counterbalance cylinder engages the ring sectors of the flexible cam ring to shift the cylinder during rotation of the rotor in response to the posture of the cam ring.

In this representative embodiment of the invention, four such cam ring sectors are provided, though only three are shown in the drawings in Fig. 2 at 170, 172, and 174. Each cam ring sector has an angular length of just under 90°. The ring sectors are arranged in end-to-end relation with each sector extending between two overarms 34 as shown in Fig. 2. Four overarms are provided in this embodiment of the pump, each extending axially of the rotor chamber adjacent the wall thereof with the overarms spaced apart 90°. Each overarm has a pair of longitudinal shoulders 176 and 178 which are received in complementary grooves 180 and 182 of the rotor chamber wall and which guide the arms for slidable movement axially of the rotor chamber. In addition to determining the angular posture of the cam ring 36, the overarms also determine the position of the gates as described more particularly hereinafter.

The inwardly extending ear 98 of each overarm is bored to receive a T-shaped pin 184 which is fixedly held in place by a small pin 186 as shown in Figs. 1 and 2. Each overarm is provided with a transversely extending slot 188 which extends across the bore in which the T-shaped pin is received. Opposite ends of each of the cam ring sectors are snugly received in the slots 188 of the overarms on each side of the T-shaped pins as shown in Figs. 2 and 12. The ends of the ring sectors are notched as at 190 to provide an ear portion 192 at opposite ends of the sectors which fits beneath the head portion 194 of the T-shaped pins. The slots 188 hold the ends of the ring sectors for movement with the overarms and the heads 194 of the T-shaped pins prevent the ring sectors from shifting radially inwardly. The transverse dimension of the head portion 194 of each T-shaped pin corresponds to the normal thickness of the cam ring sectors such that the cam followers 158 may slide from the cam sector over the heads of the pins.

The cam followers 158 are solid cylinders which have been transversely slotted as at 196, see Figs. 12, 14, 15, and 19, with opposite ends of each slot tapering outwardly as at 198 to provide a tapering entrance at each end of the slot. The followers are axially bored as at 200, to provide four points of contact 202, as shown in Fig. 19, with the cam ring when the slot 196 is received over the ring. This four-point contact ensures a constant engagement of the cam followers with the cam ring and prevents any sloppiness therebetween.

Circularly midway between the overarm 34 are pivots 204, one for each ring sector, as shown in Fig. 2. Each pivot includes a cylindrical body portion 206 axially bored as at 207 to receive a plug 208, pinned in place by pin 210, with the body 206 received for swivel movement in a radially extending bore 212 in the housing, opening at one end into the rotor chamber and opening at the other end outwardly of the housing. The pivot is held against radially outward movement by a peripherally grooved disc 214 received in bore 212 and held in place by a snap ring or the like 216. An O-ring seal received in the peripheral groove of disc 214 prevents leakage. The inner end of the body 206 is transversely slotted as at 220 to receive the outer marginal edge portion of a cam ring sector. Opposite ends of the transverse slot are widened as at 222 to provide a tapering entrance at opposite ends of the slot similar to the slots of the cam followers 158. The intersection of slot 220 and axial bore 207 provides four lines of contact 224 between the pivot and the associated cam ring sector as shown in Fig. 12. The plug 206 is transversely slotted at its inner end at 226 to receive a radially outwardly extending ear 228 of the cam ring sector associated with the pivot. The ear 228 prevents lengthwise shifting of the sector.

With the cam ring sectors connected at opposite ends to the overarms 34, and connected to the housing at their midpoints by the pivots 204, shifting of the overarms will flex the ring sectors laterally along the axis of the rotor chamber. If one overarm is shifted in one direction, and the overarms on either side of it are shifted in the opposite direction, the lateral bends imparted to the associated ring sectors will resemble a sine curve. With the cam followers 158 received over and riding the sectors, following the contour of the cam ring, the vanes will be reciprocated, according to the amplitude of the lateral deflection of the ring sectors, during rotation of the rotor.

The arcuate sectors of cam ring 36 are each of a spring sandwich construction including laminated side walls tensioned apart by a sinuous spring. Referring to Fig. 12, each side wall is shown as constructed of three thin metal strips 230 with a sinuously shaped spring member 232 disposed between the side walls tensioning them apart. The strips 230 comprising the side walls may shift longitudinally slightly relative to each other during lateral bending of the cam ring. The spring member 232 urges the side walls of the ring sectors apart and against the four lines of contact 202 of the cam followers 158 and the four lines of contact 224 of the pivots 204 to assure constant contact between the cam followers, pivots, and ring sectors. The spring also assures continuous contact of the ends of the sectors with the walls of the overarm slots 188.

Gate assembly

Means are provided at opposite ends of the rotor chamber for supporting a plurality of circumaxially spaced-apart, axially shiftable gates G, across the faces of which the vanes sweep during rotation of the rotor. Considering first the right-hand end of the pump as viewed in Fig. 1, end plate 50 is shaped to provide an annular rib 234, see Figs. 1, 3, and 16, extending inwardly of the rotor chamber and coaxial with the rotor chamber. This rib may be termed a gate receptacle. It is cut away or notched at 236 as shown in Fig. 16 at circularly spaced-apart intervals to provide gate-receiving cavities or notches. A gate G is received in each gate notch for slidable movement axially of the rotor chamber. Circularly intermediate the gate notches, the annular rib 234 is bored to provide fluid inlet and outlet passageways. In this embodiment four such passages are provided at 238, 240, 242, and 244 in Figs. 3 and 16. The passages connect with other passages (not shown) in the end plate 50 to establish communication with inlet and outlet fittings (not shown) which are adapted to connect the pump in a fluid pressure system. Four gate-receiving cavities or notches 90 are provided in annular rib 234, the cavities being circularly spaced at 90° intervals.

As shown in Figs. 1 and 3, concentric inner and outer gate rings 76 and 246, respectively, bracket the annular rib or receptacle 234 to close the gate notches and confine the gates therein. The rings may be fitted sufficiently tightly and uniformly about and within the rib that fluid pressure in the gate notches cannot leak out between the rib and rings to any appreciable extent. The inner ring 76, hereinbefore mentioned, is provided with a shoulder portion 248 within the annular confine of which the bearing assembly 74 is received and supported.

At the opposite end of the rotor chamber the annular gate receptacle 78, hereinbefore mentioned, is coaxially aligned with the axis of the rotor chamber, as shown in Figs. 1 and 3. The receptacle is provided with an annular skirt or rib 250 extending inwardly of the rotor chamber and corresponding with the annular rib 234 at the opposite end of the rotor chamber. At circularly spaced-apart intervals axially opposite the gate notches in receptacle rib 234, the annular skirt 250 is notched similar to rib 234 to provide gate-receiving cavities or notches 252 within which gates G are received for shiftable movement axially of the rotor chamber as shown in Fig. 6. The notches 252 are, in all respects, similar to those in rib 234.

Concentric inner and outer gate rings, respectively 77 and 256, bracket the receptacle skirt or rib 250 as shown in Figs. 1 and 3. Circularly intermediate the gate notches in receptacle rib 250, the rib is provided with passageways 258 which communicate with aligned apertures 260 in the outer gate ring 256, which in turn communicate with passages 262 in the center portion 44 of the housing. The passages 262 in turn communicate with passages in end plate 50, which, together with passages 238, 240, 242, and 244, lead to the fittings hereinabove mentioned, which serve to couple the pump in a fluid pressure system.

As mentioned above, the gates G at opposite ends of the rotor chamber are arranged such that they are directly opposed to each other in accurate axial alignment. The gates of each opposed pair are in opposite pumping phase and are connected together for joint shiftable movement axially of the rotor chamber within the gate-receiving notches by an overarm 34 as shown in Fig. 1 which extends axially of the rotor chamber spaced radically outwardly from the rotor. For this purpose the overarms are circumaxially arranged and are provided with inwardly extending ears 264 and 266 which are received in provided slots 268 formed in the gates. The outer gate rings 246 and 256 are suitably slotted as at 270, see Figs. 1 and 5, to permit the ears 264 and 266 to extend therethrough for shiftable movement. As the overarms are shifted, the gates connected thereto are shifted corresponding amounts, and each connected pair of gates are maintained in a determined spaced relation at whatever position they are shifted. It will be noted that because the flexible cam ring 36 is connected to the central ear 98 of each overarm 34, the length of stroke of the vanes will be varied accurately in accordance with the position of the gate. The spacing apart of the ears 98, 264, and 266 of each overarm is such that the vanes V will lightly sweep the gate faces during rotation of the rotor at whatever positions the gates are shifted to.

Pumping function

Gate position and vane reciprocation control means hereinafter described function to shift circularly alternate overarms equal amounts in opposite directions, so that circularly alternate gates are disposed in staggered relation at each end of the rotor chamber. The overarms 34 may be so shifted that the gates at each end of the rotor chamber lie with their faces in a plane normal to the axis of the rotor chamber. In such position the device will not pump any fluid; it is only when the gates are disposed in staggered relation that fluid is pumped by the device. Referring to Figs. 16 and 17 will bring out the pumping action, and also the reversibility of flow. Assume that ports 238 and 240 are connected to the conduit of a fluid pressure system through which fluid is to be moved by the pump. Assume that the rotation of the rotor 32 is in the direction of arrow D. In Fig. 16 the control means have been shifted to dispose gates $G_1$ and $G_3$ closer to the rotor and gate $G_2$ farther from the rotor. Gates $G_1$ and $G_3$ in Fig. 16 are termed blocking gates in this position because they block the flow of fluid pressure past them, while gate $G_2$ is termed a working gate because the vanes force fluid across its face from a low-pressure area L.P. to a high-pressure area H.P. Fluid enters and leaves in the direction of the arrows. As vane $V_4$ sweeps across the face of gate $G_2$, it causes a suction in low-pressure port 238 which causes fluid to flow into the rotor chamber through the port. As vane $V_3$ reaches the position of vane $V_4$ and moves over the edge of the face of gate $G_2$, it traps between it and vane $V_4$ a portion of the fluid sucked into the rotor chamber by vane $V_4$, just as did vane $V_5$ preceding it. The fluid trapped between vanes $V_4$ and $V_5$ was trapped in the same manner as discussed respecting vanes $V_3$ and $V_4$. Vane $V_4$ urges the fluid ahead of it across the faces of gate $G_2$ and as soon as vane $V_5$ effectively passes off of the face of gate $G_2$, the full force of high-pressure fluid built up in discharge port 240 is transferred to vane $V_4$. As vane $V_4$ continues to move across the gate face it forces the fluid ahead of it out through port 240. This action is repeated with each succeeding vane sweeping the face of gate $G_2$.

As the vanes move from the position of vane $V_5$ to that of $V_7$, they are retracted so that their companion connected vanes at the opposite end of the rotor may perform the same pumping function as was just performed on gate $G_2$. As vane $V_7$ begins to sweep the face of gate $G_3$, it blocks the escape of high-pressure fluid in port 240 between the end of the rotor and the face of gate $G_3$ toward the low-pressure port 242. It is apparent now that as the working gates are moved farther away from the rotor and the blocking gates are moved closer, the fluid pumped by the device will increase and vice versa. While there will be a certain amount of fluid transfer, or back feed, between the high-pressure and low-pressure ports across the faces of the blocking gates, such back feed merely returns energy to the rotor as it helps to turn the rotor in its driven direction. In such way the fluid transfer across the blocking gate faces does not decrease the pump efficiency. As long as the distance between the end of the rotor and a working gate exceeds the distance between the end of the rotor and a blocking gate, a pressure differential will be established across the working gate and fluid will be pumped.

In Fig. 17 the fluid flow is shown reversed though the direction of rotor rotation is unchanged. It will be observed that the working gate $G_2$ is now a blocking gate, and the blocking gates $G_1$ and $G_3$ are now working gates. This has resulted from shifting the gates such that the distance between the blocking gates $G_1$ and $G_3$ of Fig. 16 is now farther from the end of the rotor than the working gate $G_2$, and it will be recalled that a working gate is always farther from the rotor than a blocking gate. As a result of this change of position, fluid now enters the pump through ports 244 and 240, and leaves through ports 238 and 242. The pumping action is otherwise just the same as that described in connection with Fig. 16.

Vane counterbalancing

The passageways 138, 142, and 144 through each vane, as shown in Figs. 1 and 13, together with the vane-receiving cavities 106 in the rotor, as well as the vane counterbalancing cylinders 134, comprise the vane counterbalancing means 38 heretofore mentioned. Such means performs two important functions as pointed out in my copending application Serial No. 588,713, filed June 1, 1956. To save repetition, only the functions are mentioned and not the reasons giving rise to them, and for a more detailed discussion reference should be made to said copending application. The first of these functions is to counterbalance the fluid pressure forces acting against the outer end of each vane tending to urge the vane inwardly of the rotor. As a result of this, the mechanical effort required to reciprocate the vanes during rotation of the rotor is reduced to a minimum. The second function is to maintain complete linearity of fluid discharge in relation to rotor velocity. The vane-receiving cavities behind each vane, together with the counterbalancing cylinder associated with each vane, have a volumetric capacity equal to the fluid displacement of the extended vane, such that the fluid displaced when the vane is forced into it at the end of the rotor is absorbed by the vane-receiving cavities and the counterbalancing cylinder and therefore no disturbance of the fluid pressure discharge of the pump occurs as vanes are extended during rotation of the rotor. The reverse of this action occurs when a vane is withdrawn into the rotor.

In order to overcome the excessive outward thrust on a vane caused by the vane counterbalancing means, and to eliminate gate and vane face wear, as each vane rides onto or off of a gate face in a high-pressure area, i.e., either onto a blocking gate face, or off of a working gate face, the gates G in their faces $G_F$, as shown in Fig. 13, are provided with notches 272 and 274 at each edge. The reason for the excessive outward thrust on the vanes by the counterbalancing means at these times, as well as the action of the notches, is explained in said copending application. Briefly, the notches correct this excessive outward thrust on the vanes because the relationship in the circumaxial lengths of notches 272 and 274 is such that they simultaneously admit high-pressure fluid to the low-pressure side of each vane, while establishing communication between the vane counterbalancing means and the pressure existing at the outer end of the vane. The equalization of fluid pressures on opposite sides of the vanes at this instant serves to maintain a lubricating oil film between the gate face and vane face. While these notches are effective only at the high-pressure sides of blocking and working gates, because the fluid flow through the pump is reversible as explained above, notches are provided at each edge of each gate.

Because the effects of notches 274 at the high-pressure sides of each working gate is premature, transition of the fluid pressure from the vane passing off the working gate to the next following vane, it is necessary that the gate face circular width be equal to the circular vane spacing in the rotor plus the width of one vane face so that said following vane will be properly seated on the working gate before receiving the fluid pressure from the preceding vane. This relationship of gate face width to the vanes is shown in Fig. 13, where the width of the gate face $G_F$ corresponds to the outside circular distance between the vanes. Opposite limits of gate face $G_F$ are indicated at $G_F$–1 and $G_F$–2. A more detailed explanation of this gate face width is found in my said copending application.

*Gate counterbalancing means*

Before the gates G may be readily shifted axially of the rotor chamber by the overarms 34, certain difficulties must be overcome. Referring to Fig. 16, and vane $V_5$, when such vane progresses off of gate $G_2$ sufficiently to break sealing engagement with the gate face, the high fluid pressure load drops back to vane $V_4$. This abrupt transferral of pressure to vane $V_4$ affects the relatively large area of the face of gate $G_2$. This abrupt increase in pressure on the gate face simultaneously produces a large axial thrust on the gate tending to urge it away from the rotor and outwardly of the rotor chamber. While this condition is no problem in a fixed displacement pump such as disclosed in my copending application, it assumes substantial importance in a variable displacement pump where it is desired to adjust the displacement by axial shifting of the gates. If this axial thrust is not somehow counterbalanced, the overarm 34 would be subjected to substantial endwise thrust, and the overarm would have to be quite massive to withstand such thrust. In addition, the control means for shifting the overarm, hereinafter described, would also need to be quite massive. The massive strength of the overarm control means would result in a lack of sensitivity of control of this function.

These axially outward thrusts on gate $G_2$ would occur each time a vane passed off of the gate into a high-pressure area and the load transition to the next following vane occurred. Just the reverse of this occurs with respect to a blocking gate such as gate $G_3$ in Fig. 16. Before vane $V_7$ moves sufficiently far across the face of gate $G_3$ to form a seal with the face, high-pressure fluid is acting against the trailing side of vane $V_8$ and against the large area of the face of gate $G_3$. Just after vane $V_7$ makes a seal with the face of gate $G_3$, vane $V_8$ breaks its seal with the face of the gate and immediately the high-pressure load acting against the gate face drops substantially. This becomes of importance when one considers that a blocking gate similar to $G_3$ is disposed opposite gate $G_2$ at the opposite end of the rotor chamber, and is connected to gate $G_2$ by an overarm 34, and the action just described for gate $G_3$ is occurring on it. With the overarms 34 connecting gates which are in opposite pumping phases, it becomes apparent from the foregoing that the forces on the overarms are completely alternating in character.

Because as a vane sweeps across a gate face and a progressively greater or lesser, as the case may be, amount of the gate face is exposed to a high pressure, the axial outward thrust on opposite ends of each overarm progressively simultaneously increases and decreases. Thus the resultant forces transmitted to the overarms and consequently to the overarm control means 42 are completely alternating in character, the cycle pattern starting with an abrupt directional reversal of maximum load followed by a progressive force reversal back to a starting condition.

This is best illustrated by the positions (1) to (8) shown in Figs. 24 and 25. The direction and amount of rotation of the rotor from the instant that the vanes start one pumping cycle, is indicated by the horizontal arrows and degree and plus or minus indications to the left of each diagram. A working gate is indicated at $G_1$ and its companion blocking gate at the other end of the rotor chamber by $G_4$. At the beginning of a new pumping cycle, i.e., position (1), 0+°, vane $V_1$ has just made sealing engagement with gate $G_1$, while vane $V_2$ has just passed far enough across so that the high pressure from the areas H.P. has been transferred across the face of vane $V_2$ to vane $V_1$. The entire face $G_F$ of the gate from the leading edge of vane $V_1$ to the high-pressure side of the gate is now subjected to high pressure. The small ascending arrows indicate equal increments of fluid-pressure force acting on the gate face $G_F$.

It will be observed that no pressure is acting against the face of companion blocking gate $G_4$. This is because vane $V_{10}$ has moved sufficiently far over the edge of gate $G_4$ to make sealing contact therewith to prevent continued entry of high-pressure fluid from the high-pressure area H.P. following vane $V_{10}$. Vane $V_{11}$ has moved sufficiently far so that its sealing engagement with gate $G_4$ is broken and the high-pressure fluid that existed between vanes $V_{10}$ and $V_{11}$ has escaped to the low-pressure area L.P.

Now as vanes $V_1$ and $V_{10}$ continue to move as shown by the successive positions, the fluid-pressure forces acting on the face of gate $G_1$ decrease as represented by the ascending arrows while the fluid pressure forces on the face of gate $G_4$ increase, as represented by the descending arrows adjacent the face of gate $G_4$. In position (8), 30–° of Fig. 25, the cycle is almost ready to repeat itself. When the rotor moves to 30+°, the diagram will change to that originally shown in position (1) in Fig. 24. From a study of these diagrams the alternating character of the fluid-pressure forces on the gates is apparent, and consequently the alternating character of the forces on the overarms connecting the gates of each pair.

My approach to eliminating the objectionable character of these alternating forces on the overarm control means 42 resides in providing gate-counterbalancing means which acts against each gate to substantially counterbalance the fluid-pressure forces acting against the gate face. Because the area of each gate face acted upon by fluid pressure is constantly changing as the vanes sweep the face, thereby constantly varying the alternating thrusts on the overarms, I have treated the alternating thrusts on the overarms as a series of thrusts of lesser intensity but greater frequency, and counterbalance these thrusts. To accomplish this I provide a plurality of gate displacement chambers or what may be termed fluid-pressure actuators for each gate which are successively pressurized or depressurized, depending upon whether the gate is, respectively, a blocking or a working gate, as a vane sweeps the gate face. This successive pressurization or depressurization serves to progressively increase or decrease the counterbalancing thrust on each gate in substantial accordance with the varying thrust on the gate face. While this does not result in perfectly counterbalancing the alternating thrusts on the overarms it sufficiently reduces the intensity of the thrusts so that the overarm control means 42 need not be of massive size and the force required to control the positions of the overarms may be small, thereby resulting in increased control sensitivity. An anti-backlash feature of the control means prevents any flutter or backlash that might occur during the short intervals between the counterbalanced series of impulses.

Shown in Fig. 6 is a cross sectional view through one of the gates G at the left-hand end of the pump as viewed in Fig. 1, which is representative of the construction of all of the gates at both ends of the rotor chamber. The gate is provided with four displacement chambers or gate fluid pressure actuators 280, 282, 284, and 286 at the rear end of the gate. These actuators are formed by notches 288 and 290 cut in the gate receptacle rib and by notches 292 and 294 cut in the rear end of the gate. Those portions of the gate and receptacle lying between these notches form what may be considered pistons. Such portions are indicated at 296 and 298 in the gate receptacle with corresponding portions appearing in the gate itself. The effective cross sectional force area of each of these chambers is approximately one-fourth that of the affected area of the gate face $G_F$. These chambers are operable to urge the gate toward the rotor when they are pressurized.

In order to successively pressurize the displacement chambers as a vane sweeps a blocking gate or successively depressurize the chambers as a vane sweeps a working gate, passageways are provided which open at one end into the displacement chambers and, in this illustrative embodiment, at the other end through the gate face. One passageway is provided for each displacement chamber, the passageways being indicated at 300. The gate face is provided with a slot where each passageway opens through the gate face. These slots are shown at 302, 304, 306, and 308 in Fig. 6 and in Fig. 13. Each slot has a circular length equal that of the circular width of the vane face between notches 310 and 312. The supply ports or slots 302—308 are so positioned that when fluid pressure is first applied to the entire width of a working gate face, such as is shown in position (1) of Fig. 24, all four displacement chambers are supplied with fluid pressure and thus perfect balance exists at this time. In position (1) of Fig. 24, the descending arrows in the displacement chambers each represent a force equal to the force represented by each of the ascending arrows acting against the gate face. In the remainder of the positions of the vanes $V_1$ and $V_{10}$ during passage across gate $G_1$, these force arrows have been combined to facilitate reading the drawing. Each of the arrows 314 is equivalent to four of the force arrows shown in position (1) while the arrows 316 are equal to two of the force arrows shown in position (1). The arrows 318 are equal to each of the arrows shown in position (1).

As vanes $V_1$ and $V_{10}$ in Fig. 24 move across the gate faces they progressively decrease the affected area of the face of gate $G_1$ and increase the affected area of the face of gate $G_4$. As the vanes progressively increase or decrease the affected gate face areas they also progressively increase or reduce the number of ports 304—308 which are exposed to the fluid pressure acting against the gate faces thereby increasing or decreasing the counterbalancing effect of the displacement chambers.

With the provision of notches 310 and 312 in the vane faces, the ports 302—308 are fully closed only instantaneously so that in the case of a working gate, the high pressure in each displacement chamber is maintained until the vane is directly over the port and then almost immediately thereafter the pressure in the displacement chamber drops back to low pressure. Therefore the vanes act like valves which successively open, close, and thereafter open the passages 300 in the gates to control the pressure in the displacement chambers.

It might be expected that with symmetrically spaced ports at opposite gate faces, such as the faces of gates $G_1$ and $G_4$ shown in Fig. 24, the maximum force allowed to be transmitted to the overarm control means 42 would be equivalent to the thrust developed by exposing one-fourth of the gate face area to the high-pressure fluid. However, I have found that by disposing the ports in opposed gate faces out of phase 90° in opposite directions, in other words, misaligning them by $\frac{1}{16}$ of 30°, the thrust on the overarm control means may be reduced by a factor of eight instead of four.

In Fig. 24 the ports 308 in the faces of gates $G_1$ and $G_4$ are shown disposed out of phase by 90° in opposite directions. The effect of this will be observed in considering position (2), and the succeeding positions of Figs. 24 and 25. Considering position (2) of Fig. 24, the vectorial analysis to the right indicates that the resultant of the forces acting on gate $G_1$ is a force of one unit tending to urge the gate toward the rotor, such force being indicated at 320. The resultant of forces acting on gate $G_4$ is a 1-unit force 322 urging the gate away from the rotor. If gates $G_1$ and $G_4$, together with the connecting overarm 34, are considered as an assembly, the total force transmitted to the overarm control means 42 is represented by a force of two units by the arrow 324. The arrows 320 and 322 may be considered each to equal that force on the overarm which would amount to the exposure of one-sixteenth of the gate face to high-pressure fluid, so that the arrow 324 represents a force equal to the exposure of one-eighth of a gate face to high-pressure fluid. Obviously this is a substantial reduction from the force which would otherwise be imposed if there were no gate counterbalancing.

In position (3), vane $V_1$ has moved to block the entry of high-pressure fluid into port 308 and has exposed the port to the low-pressure area following the vane. The vectorial analysis of forces on gate $G_1$ in position (3) is shown as arrow 326 representing 3 force units. A vectorial analysis of the forces acting on gate $G_4$ indicates a force of one unit in arrow 328. A resolution of these forces is indicated by arrow 330 equal to two units of force, which is the same as arrow 324.

If ports 308 in the gates $G_1$ and $G_4$ were axially aligned instead of being offset by one-sixteenth of 30° in opposite directions, or, in other words, 90° out of phase, while the maximum number of unit forces acting on each gate face would be two units, the forces would be additive, and therefore a total of four unit forces would alternately be applied, in opposite directions, to the overarm control means. But with the 90° out-of-phase spacing of the ports in opposed gates, the fluid-pressure forces acting on the overarm control means are resolved such that the resultant does not exceed more than 2 force units or a thrust equal to the exposure of one-eighth of the gate face to high-fluid pressure.

In position (4) of Fig. 24, vane $V_1$ has moved across the face of gate $G_1$ to reduce the affected area of the face such that the resultant force on the gate face is equal to one force unit as represented by arrow 332. Vane $V_{10}$, on the other hand, has moved to a position such that it is almost ready to uncover port 308 in the face of gate $G_4$, and the resultant forces acting on gate $G_4$ are represented by three force units 334 tending to urge the gate away from the rotor. Resolution of forces 332 and 334 shows a total force of two units as represented by arrow 336 tending to urge the gate assembly toward vane $V_1$ and away from vane $V_{10}$.

The position of vanes $V_1$ and $V_{10}$ following slight continued rotation of the rotor from position (4) is shown in position (5) of Fig. 25. In such diagram port 308 in gate $G_1$ is fully open and exposed to low-pressure fluid while port 308 in gate $G_4$ has been uncovered and is exposed to high pressure fluid. The resultant of forces acting on gate $G_1$ is represented by one force unit 338. With the displacement chamber pressurized by port 308 of gate $G_4$, the resultant force acting upon gate $G_4$ is one force unit 340. A resolution of these forces acting on the gate assembly is two force units represented by arrow 342. A repetition of these steps occurs as vanes $V_1$ and $V_{10}$ pass each of the succeeding ports in gates $G_1$ and $G_4$ until the 288+° position is reached wherein almost the entire area of the face of gate $G_1$ has been crossed by vane $V_1$ and all of the ports 302—308 of such gate have been exposed to low-pressure fluid. The resulting force acting on gate $G_1$ in this position (7) is a force of one unit as represented by arrow 344. On the other hand, all of the ports 302—308 in gate $G_4$ have been exposed to high-pressure fluid and pressurized with the resultant force on gate $G_4$ equal to one force unit represented by arrow 346. A resolution of the forces on the gate assembly is represented by two force units in the arrow 348.

As vane $V_1$ moves to the 30—° position, it fully blocks the face of gate $G_1$ from high-pressure fluid and exposes the face to low-pressure fluid so that the resultant forces acting on the face of gate $G_1$ are zero. Vane $V_{10}$ has moved when in position (8) sufficiently far across the face of gate $G_4$ so that the affected area of the gate is now equal to the effective area of the displacement chambers communicating with ports 302—308 with the result that the resultant of forces acting on gate $G_4$ is zero. The gate assembly is now in perfect balance as it was in the original 0+° position in Fig. 24. When the rotor moves from the 30—° to 30+° position, the force diagram immediately changes back to that shown in position (1) of Fig. 24.

Shown in superimposed dotted outline upon the vectorial analyses of positions (7) and (8) in Fig. 25 is the force pattern which would be imposed upon the gate assembly without the provision of the gate counterbalancing means. It will be noted that without the counterbalancing, when the rotor is in the 0+° position of Fig. 24, the total force acting on the gate assembly, as represented by line 350, would be approximately eight times as great as the force imposed with the use of a counterbalancing means. This force would alternate during movement of the vanes across the gate faces such that at the completion of the cycle, the force would be eight times as great as occurs with the counterbalancing, and such force would be in a direction opposite to the force at the beginning of the cycle as represented by the line 352.

Upon study of Figs. 16 and 17, it will become apparent that the high pressure in the area of passageway 240 will react against the edge 354 of blocking gate G₃ and against the edge 356 of working gate G₂, and tend to urge the gates sideways in their gate-receiving notches in the receptacle rib 234. This sideways thrust on the gates would tend to make them bind in the gate-receiving notches thereby inhibiting axial shifting of the gates in response to movement of the overarms. In order to overcome this difficulty, I have provided counterbalancing chambers 358 and 360 at the sides of each gate. These chambers are shown in Fig. 6 and are formed by notching the side walls of the gate-receiving cavities 252 as at 362 and 364. The gate itself is notched as at 366 and 368. These counterbalancing chambers are connected by passages 370 to opposite sides of the gate as shown, for example, in connection with gate G₃ in Fig. 16. The passages 370 do not intersect one another so that the displacement chambers 358 and 360 are hydraulically isolated from each other.

Considering Fig. 16, and assuming that high pressure is present at side 354 of blocking gate G₃, this high pressure will follow passage 370 to counterbalancing chamber 360. The high pressure thereby transmitted to chamber 360 will tend to counterbalance the thrust of the high-pressure fluid acting against side 354 of the gate. Just the reverse of this occurs in connection with a working gate. In this way the side thrusts of fluid pressure acting against the sides of gates are counterbalancing so that the gates may be shifted upon movement of the overarms to vary the fluid discharge of the pump.

In order to retain the highly advantageous vane balancing features of my copending application, and which have been described above, a difficult problem arises. While the vanes are in working phase in contact with gate faces, i.e., when a fluid pressure differential exists across a vane in contact with a gate face, the vane counterbalancing means of one vane of each contacting pair of vanes is hydraulically isolated from the other vane counterbalancing means of the companion vane at the opposite end of the rotor. This serves to provide a hydraulic block preventing any change in the stroke of the vanes for purposes of varying the pump discharge.

To solve this problem each gate receiving cavity in each receptacle rib is provided, as representatively shown in Fig. 6, with an exchange chamber 372. To provide this exchange chamber, the back wall of the cavity is notched as at 374. The exchange chamber of each gate communicates with a fluid passageway 120, heretofore mentioned, and which extends axially through the inner gate ring associated with the receptacle, i.e., either ring 76 or 77, as shown in Figs. 1 and 5. These inner gate rings are stationary with the result that the passages 120 communicate periodically with passages 124 in the inner rotor rings 110 and 114 through the slots 128 and 130 at the ends of the passageways at the interfaces 116 and 118 of the rotor and gate rings. Inner rotor rings 110 and 114 rotate with the rotor. Passages 124 and 126 communicate with the vane counterbalancing means.

With the provision of exchange chambers 372 associated with the gates, which communicate with the vane counterbalancing functions, changes in the stroke of the vanes displacing fluid from the counterbalancing vane functions will be transferred to the central exchange chambers of the gates. In order for this to be properly effected, the exchange chambers 372 must have exactly the same effective area as that of the total vane counterbalancing means.

Referring to Fig. 13, it will be noted that each passageway 124 from the vane counterbalancing function, through the inner rotor ring 110, has a timed ported engagement with the passageway 120 through the provision of the cooperating slots 128 and 130 at the inner faces of the rotor ring and gate ring respectively. The fluid communication between passageways 124 and 120 is maintained only during the working engagement between the particular vane and the particular gate. This central gate exchange chamber 372 in each gate thereby permits axial adjustment of the gates and the vanes while retaining the highly advantageous vane-balancing system.

*Gate position and vane reciprocation control means*

The gate position and vane reciprocation control means, or, as it may be simply termed, the overarm control means 42, serves to shift the overarms to accurately reposition the gates and vary the stroke of the vanes to alter the discharge of the pump. Such means not only functions to shift circularly alternate overarms equal amounts in opposite directions but in addition prevents any chattering of the overarms after they have been shifted to a new position, or any backlash during their shifting. Such control means is shown in Figs. 1, 2, 7–11, and 20–23.

As shown in Fig. 1, the control means 42 is disposed at the left-hand end of the pump. It is operated by a pair of diametrically opposed pins 65, see Figs. 2 and 7, only one of which is shown, which are connected to the actuating ring 62 and extend through end wall 48 of the housing through arcuate slots, one being indicated at 63. The inner end of the pins engages a ring 380, see Figs. 8 and 20, which is supported for rotatable movement in a circular notch 382 formed in the gate receptacle 78, see Fig. 1. Ring 380 rides the outer race of shaft bearing 72. The ring is provided at diametrically opposite positions with a pair of radially outwardly extending T-shaped lugs 384, only one of which is shown. The receptacle 78 is notched as at 385 adjacent each lug so that the ring 380 and its associated lugs may rotate a limited amount. The head of the lug is shaped to define a yoke having arms 386 and 388, see Figs. 10, 11, and 22.

The radially extending lugs 384 are adapted to rotatively shift camming means operatively associated with the four overarms 34 to shift the overarms axially. An annular camming plate 394, generally Z-shaped in cross section, as shown in Figs. 8 and 20–23, is received over the periphery of gate receptacle 78 for rotatable movement with the head portion of each radially extending lug 384 extending through a provided notch 396 at diametrically opposite points in the plate to permit limited shifting of the lugs relative to the plate. The camming plate is provided with four camming surfaces 403, 404, 405, and 406, which are defined by elements 400 and 402, which are integral with or may be separate from and secured to the plate 394 in any convenient manner, as by bolts 398. Circularly alternate cam surfaces are oppositely directed, and when taken together form a generally sinuous surface coaxial with and facing outwardly of the rotor chamber. Each overarm has a hooked end defining a cam follower 408 which extends over the camming elements 400 and 402 and radially inwardly to abut the camming surfaces thereof as shown in Figs. 8, 9, and 20.

Two pairs of relatively shiftable cam members, each pair being of substantially 180° in circular length, are disposed end to end, and encircle annular plate 394 and cooperate with the camming surfaces of plate 394 to provide a camming assembly having a sinuous channel for receiving the followers 408 of the overarms. Only one pair of such cam members is shown in full at 410 and 412, the ends of the other pair being indicated at 414 and 416 in Fig. 9. Each pair of cam members have camming surfaces 418 and 420 which are opposed to the camming surfaces 404 and 406. The cam followers 408 of the overarms are suitably angled with respect to the axis of the overarms so that the followers will lie in the sinuous camming channel formed by the opposed camming surfaces of the cam members and camming plate 394 as shown in Figs. 9 and 20.

It will be noted that circularly alternate courses 422, 424, 426, and 428 of the camming channel are oppositely directed. One of the circularly alternate overarm cam followers is received in each course of the channel.

It is now apparent that upon rotation of plate 394 and cam members as an assembly, circularly alternate overarms 34 will be shifted axially in opposite directions. The angles of lead of the courses of the sinuous camming channel are equal in opposite directions and consequently circularly alternate overarms are shifted equal amounts in opposite directions.

The head of each radial lug 384 is operatively connected with the camming plate 394 and with one of the two pairs of camming members. The connection of the lugs with the plate and members is effected through an anti-backlash mechanism comprising a pair of units disposed 180° apart around cam plate 394. These anti-backlash units perform two functions in addition to connecting the lugs with the camming assembly. First, they automatically tension the walls of the sinuous camming channel together to grip the cam followers of the overarms to prevent chattering of the overarms following their adjustment. Second, they automatically shift such walls apart slightly to permit the sliding movement of the cam followers through the channel during rotation of the plate and cam members. The amount by which the opposed walls of the sinuous camming channel are shifted apart during rotation of the camming assembly is only just sufficient to permit the necessary sliding movement of the followers in the sinuous channel; the shifting not being sufficient to permit any chattering between the overarms and the camming assembly during rotation of the assembly.

One of the units of the anti-backlash mechanism is shown in Figs. 9, 11, and 20-23. As shown in Figs. 21 and 23 it includes a pair of radially inwardly extending cams 430 and 432 integral with the members 410 and 412, respectively, at the thicker meeting ends of the members. Considered as a unit, the pair of cams is of pentagonal shape, with upper surfaces 434, see Fig. 23, and the sides 436 being camming surfaces. Meeting ends of the cam members on the inside of the cams are cut away as at 438 to form a slot adapted to receive leaf springs 440 which tension the members circularly apart, and toward the opposed side wall of the camming channel causing the side walls of the channel to grip the overarm cam followers 408 snugly in the sinuous channel between the cam members and the camming surfaces of the plate 394.

Adjacent the cams 430 and 432, the cam members are provided with opposed slots 442 and 444 upwardly through which extend opposed C-shaped cam compressors 446 and 448. The undersides of the tops of the compressors are provided with beveled camming surfaces overlying the camming surfaces 434 of the cams 430 and 432. At the bottom the compressors are beveled as at 450 to seat upon a wedge-shaped cam 452 which is integral with the cam ring 394 as shown in Fig. 23. The compressors 446 and 448 are held in place by bearing surfaces 456 and 458 of the offset ears 386 and 388 of the radially extending lug 384 as shown in Figs. 10 and 22. To complete the anti-backlash unit, a U-shaped cam compressor 460 having upwardly outwardly beveled camming surfaces 462 abutting sides 436 of the pentagonal cam unit of the cam members is received within the C-shaped compressors as shown in Fig. 21.

In operation the spreader springs 440 urge the cam members apart circularly, gripping the overarm cam followers 408 to lock the overarms in fixed positions. As handle 58, see Fig. 2, is turned clockwise, pins 65 rotate the actuator ring 380 to move the radially extending lugs 384 in the direction of the arrow in Fig. 22. As the lug begins to move, ear 388 bears against compressor 448 urging it to ride up the incline 434 of cam 432 and up the incline of cam wedge 454. As the compressor 448 rises, it lifts compressor 460 which in turn urges the cams 430 and 432 toward each other, thereby moving cam members 410 and 412 to widen slightly the sinuous camming channel to release the grip on the overarm cam followers 408. In such fashion the side walls of the sinuous channel are wedged apart. Thereupon the cam assembly of plate 394 and the members 410 and 412 can rotate to shift the overarms axially. It is apparent from a study of the arrangement of the anti-backlash units that the members 410 and 412 will only be moved toward each other sufficiently to effect rotation of the cam assembly.

Once rotation of handle 58 is stopped, the cam compressors of the anti-backlash units return to their normal relaxed positions, thereby permitting the spread springs 440 to urge the cam members circularly apart to relock the overarm cam followers 408 between the cam members and the camming surfaces of cam plate 394. The length of the oppositely directed courses of the camming channel is such that a rotation of the camming assembly to either extreme position will cause reversal of the pump discharge and maximum volumetric discharge. With the cam followers 408 lying substantially midway of the length of each course of the camming channel, the gates G are disposed in coplanar relation at each end of the rotor chamber with the discharge of the pump consequently being zero. Rotation of the camming assembly in either direction will cause the camming surfaces to traverse the cam followers and effect a pump discharge, the direction of discharge depending upon the direction the cam assembly is rotated.

It will be noted that this gate position control means is automatically self-locking. The angle A between the camming surfaces of each course of the channel and the direction of movement of the arms, as shown in Fig. 9, is such that the arms cannot inadvertently cause rotation of the camming assembly. Similarly, angle A is such that while the spreader springs will overcome any tendency to compress by the action of the overarms against cam members 410 and 412 caused by thrusts on the gates transmittted to the overarms, still the springs may be readily compressed by a small torque on the handle 58.

What I claim is:

1. In an axially shiftable vane pump or motor having a housing defining a rotor chamber: a rotor mounted in the chamber for rotation on the axis thereof and providing working chambers at opposite ends of the rotor, a plurality of pairs of oppositely extending connected vanes mounted on the rotor in circumaxially spaced relation for shiftable movement axially of the rotor beyond opposite ends thereof and within said working chambers, a plurality of circumaxially spaced-apart gates at opposite ends of the rotor chamber supported for shiftable movement axially of the rotor chamber and each having a face exposed to the working chamber and across which face the vanes sweep, means connecting together in pairs gates in opposite pumping or motor function phases in opposite working chambers for joint shiftable movement toward and away from the rotor, and fluid pressure operated counterbalancing actuator means operatively connected with each gate and in fluid communication with the fluid pressure in the working chamber to which the face of the gate is exposed and operable to urge the gate toward the rotor to oppose the outward thrust on the gate by fluid pressure in the working chamber at the face of the gate.

2. In a fluid pressure power converter: a housing defining a rotor chamber; a rotor mounted for rotation in the chamber on the axis thereof; a plurality of circumaxially arranged axially shiftable vanes mounted on the rotor and projecting beyond an end thereof; a plurality of circumaxially arranged gates disposed at one end of the rotor chamber in opposition to the vanes and having faces across which the vanes sweep during rotor rotation; cam means for shifting the vanes axially during angular travel between the gates, said means being rotationally stationary and encircling the rotor and defining spaced-apart parallel camming surfaces; cam followers for the vanes extending radially therefrom and having open ends embracing said spaced-apart camming surfaces to follow the contour thereof during rotor rotation; and spring means tensioning apart the camming surfaces against the cam followers to take up play therebetween.

3. In a fluid pressure power converter: a housing defining a rotor chamber; a rotor mounted for rotation in the chamber and carrying a plurality of circumaxially arranged vanes axially shiftable beyond an end thereof; a plurality of circumaxially arranged axially shiftable gates at one end of the chamber in opposition to the vanes and having faces across which the vanes sweep during rotor rotation; mechanism coupled with the gates for shifting them to vary the power conversion factor of the converter and including means extending axially of the rotor chamber radially outwardly of the rotor; cam ring means flexible axially of the rotor chamber encircling the rotor and connected to the first-mentioned means to be flexed thereby amounts equal to the axial shifting of the gates, said cam ring means including a plurality of laterally flexible ring sectors arranged end-to-end and each having spaced apart relatively shiftable side walls, spring means disposed between the side walls tensioning them apart; and cam followers for the vanes received over the side walls of the ring sectors to overlie the side walls with the spring means urging the side walls against the cam followers to take up play therebetween.

4. In a fluid pressure power converter: a housing defining a rotor chamber; a rotor mounted for rotation in the chamber and carrying a plurality of circumaxially arranged vanes axially shiftable beyond an end thereof; a plurality of circumaxially arranged axially shiftable gates at one end of the chamber in opposition to the vanes and having faces across which the vanes sweep during rotor rotation; mechanism coupled with the gates for shifting them to vary the power conversion factor of the converter and including a plurality of circumaxially arranged arms each connected to a gate and extending axially of the chamber spaced radially outwardly from the rotor; laterally flexible cam means connected to said arms to be shifted thereby and encircling the rotor, said cam means including a plurality of independent ring sectors disposed in end-to-end relation with one sector extending circularly between adjacent arms and coupled at opposite ends to the arms, cam sector pivot means connected to the housing and coupled with each sector circularly midway between adjacent arms; and cam follower means cooperating with the vanes and cam sectors to shift the vanes axially in accordance with the contour of the sectors during rotor rotation.

5. In a fluid pressure power converter: a housing defining a rotor chamber; a rotor mounted for rotation in the chamber; a plurality of circumaxially arranged axially shiftable vanes mounted on the rotor and shiftable beyond opposite ends thereof; a plurality of circumaxially arranged axially shiftable gates at each end of the rotor chamber in opposition to the vanes and having faces across which the vanes sweep during rotor rotation; fluid pressure counterbalancing actuator means connected with each vane to oppose axial thrust thereupon by fluid pressure at the end of the rotor; fluid pressure counterbalancing actuator means connected with each gate to oppose thrust thereupon by fluid pressure at the adjacent end of the rotor; mechanism for shifting the gates to vary the power conversion factor of the converter including a plurality of circumaxially arranged arms extending axially of the rotor chamber spaced radially from the rotor and each connected to a gate at opposite ends of the rotor chamber; adjustable cam means encircling the rotor and including a plurality of ring sectors flexible axially of the rotor chamber, each of said sectors extending between adjacent arms and coupled at opposite ends with the arms for shiftable movement therewith, ring sector pivot means coupling the sectors to the housing circularly midway between adjacent arms such that the sectors pivot thereabout upon axial shifting of said arms to vary the contour of the sectors; and cam followers coupling the vanes to the sectors and following the contour of the sectors to shift the vanes during rotation of the rotor.

6. In a fluid pressure power converter: a housing defining a rotor chamber; a rotor mounted for rotation in the chamber; a plurality of circumaxially arranged axially shiftable vanes mounted in the rotor and projecting beyond an end thereof; a plurality of circumaxially arranged axially shiftable gates at one end of the rotor chamber in opposition to the vanes and having faces across which the vanes sweep during rotor rotation; means operatively connected with the vanes to shift them axially during angular travel between the gates; gate shifting mechanism coupled with the gates to shift the same axially toward and away from the rotor to vary the power conversion factor of the converter; self-locking control mechanism coupled with the gate shifting mechanism to shift the same to and lock the same in adjusted positions; one of said mechanisms including anti-backlash means for eliminating play in the coupling between the two mechanisms.

7. In a fluid pressure power converter: a housing defining a rotor chamber; a rotor mounted for rotation in the chamber; a plurality of circumaxially arranged axially shiftable vanes mounted in the rotor and projecting beyond an end thereof; a plurality of circumaxially arranged axially shiftable gates at one end of the rotor chamber in opposition to the vanes and having faces across which the vanes sweep during rotor rotation; means operatively coupled with the vanes to shift them axially during angular travel between the gates; an arm coupled to each gate and extending axially of the housing and provided with a cam follower portion; gate shifting control mechanism operatively coupled with the cam follower portion of each arm to shift the arms, said control mechanism including relatively shiftable cam means and cam actuator means, said cam means having relatively shiftable spaced apart camming surfaces tensioned against opposite sides of the cam follower portion of each arm, said actuator means coupled with the camming means to shift relative thereto and wedge the camming means apart and move the camming surfaces in traverse of the cam follower portions of the arms to shift the arms.

8. In a fluid pressure power converter: a housing defining a rotor chamber; a rotor mounted for rotation in the chamber; a plurality of circumaxially arranged axially shiftable vanes mounted in the rotor and projecting beyond an end thereof; a plurality of circumaxially arranged axially shiftable gates at one end of the rotor chamber in opposition to the vanes and having faces across which the vanes sweep during rotor rotation; means operatively connected with the vanes to shift them axially during angular travel between the gates; a plurality of circumaxially arranged arms with one coupled to each gate to shift the gate, cam means rotatably connected to the housing and including an annular camming channel, and said camming channel having successively oppositely leading courses with a portion of each arm received in one of the courses such that upon rotation of said means circularly adjacent arms are shifted in opposite directions.

9. In a variable displacement axially shiftable vane pump or motor having a housing defining a rotor chamber in which a rotor rotates carrying a plurality of axially shiftable circumaxially arranged vanes, a plurality of circumaxially arranged axially shiftable gates in one end of the rotor chamber having faces across which the vanes sweep, a plurality of circumaxially arranged arms connected to the housing for guided shiftable movement with one connected to each gate, means for shifting circularly adjacent arms equal amounts in opposite directions to correspondingly vary the positions of the gates, said means defining an annular camming channel rotatably connected to the housing and having equally oppositely extending courses within each of which is received a portion of one of said arms, the side walls of said channel being relatively shiftable toward and away from each other, means tensioning the side walls toward each other to normally grip said portion of each arm therebetween, wedge means coupled with the side walls to urge them apart to release the tension on the arm portions and permit rotation of the cam channel to effect traverse of the courses relative to the arm portions thereby shifting the arms, and means coupled with the wedge means to actuate the same to wedge apart said side walls and effect rotation of the cam channel.

10. In an axially shiftable vane pump or motor having a stator member and a cooperating rotor member cooperatively defining an annular working chamber: a plurality of vanes mounted on one of the members in circumaxially spaced relation for shiftable movement in a direction axially of the rotor member and within the working chamber, a plurality of circumaxially spaced-apart gates opposed to the vanes and supported on the other of said members for shiftable movement axially of the chamber and having faces across which the vanes sweep, a variable displacement fluid pressure operated counterbalancing actuator for each vane communicating with the fluid pressure at the outer end face of the vane in the rotor chamber, means connected to the gates for axially adjusting their position relative to the vane-carrying member to vary the spacing therebetween, a variable displacement exchange chamber connected with each gate and responsive to axial shifting thereof to vary the displacement of the chamber accordingly, and each exchange chamber communicating with the fluid pressure actuator of each vane sweeping the gate face.

11. In a fluid pressure power converter: a stator member and a cooperating rotor member; a plurality of circumaxially spaced-apart axially shiftable vanes carried by one of said members; a plurality of circumaxially spaced-apart gates carried by the other of said members and opposed to the axis of shiftable movement of the vanes, each gate having a face across which the vanes sweep during rotor rotation; said gates being shiftable toward and away from the vane-carrying member to vary the spacing therebetween; each gate face having an angular width sufficient to allow one vane to be constantly in fluid sealing relation therewith during rotor rotation; fluid pressure actuator means associated with each gate to counterbalance the axial thrust of fluid pressure acting upon the gate face; and means establishing fluid pressure communication between said actuator means and the fluid pressure acting upon the gate face at angularly spaced-apart intervals across the gate face, to progressively increase or decrease the fluid pressure counterbalancing thrust on the gate face as a vane sweeps the gate face.

12. In a fluid pressure power converter: a stator member and a cooperating rotor member defining a working chamber therebetween; one of said members provided with a plurality of circumaxially spaced-apart vanes shiftable in a direction axially of the rotor member within the working chamber; the other of said members provided with a plurality of circumaxially spaced-apart gates axially opposed to the vanes and having faces in the working chamber across which the vanes sweep during rotor rotation; each of said gates being shiftable in a direction extending axially of the rotor toward and away from the vane-carrying member to vary the power conversion factor of the converter; mechanism operatively connecting the vanes and gates to axially shift the vanes during relative angular travel through said chamber between the gates, and vary the length of stroke of the vanes while simultaneously and correspondingly varying the axial position of the gates with respect to the vane-carrying member; fluid pressure operated counterbalancing means connected with each of the gates; and passageway means establishing fluid pressure communication between the counterbalancing means and fluid pressure within the working chamber acting against the gates to oppose the thrust imposed on the gate by such pressure within the working chamber to reduce the load on said mechanism.

13. The invention as defined in claim 12 characterized in that a fluid pressure operated counterbalancing actuator is provided for and operatively connected with each of the vanes and responsive to fluid pressure forces in the working chamber acting against the vanes to oppose the thrusts on the vanes by such pressure forces.

14. The invention as defined in claim 13 characterized in that fluid pressure accumulating means is provided communicating with the counterbalancing actuator of each vane in working phase to receive fluid pressure from the counterbalancing actuator or return fluid pressure thereto upon variations in the length of stroke of the vanes.

15. The invention as defined in claim 13 characterized in that fluid pressure accumulating means is provided communicating with the counterbalancing actuator of each vane in working phase and responsive to axial changes in gate pressure to receive fluid pressure from or return fluid pressure to the vane counterbalancing actuators in accordance with the changing requirements thereof as the stroke of the vanes in working phase is varied.

16. The invention as defined in claim 13 characterized in that each vane counterbalancing actuator communicates with fluid pressure in the working chamber through a face of the vane that sweeps the gate faces, said gates and the member in which they are provided cooperatively defining a variable displacement exchange chamber the effective displacement of which varies as a function of the position of the gate from the vane-carrying member, said exchange member of each gate communicating with the counterbalancing actuator of each vane sweeping the gate face to receive fluid pressure from the actuator or return fluid pressure thereto in accordance with changes in gate position to facilitate variations in the length of stroke of the vanes as they sweep the gate faces.

17. In a fluid pressure power converter: a stator member and a cooperating rotor member, said members cooperatively defining an annular raceway; a plurality of circumaxially spaced-apart axially shiftable vanes carried by one of said members; a plurality of circumaxially spaced-apart gates carried by the other of said members and opposed to the axis of shiftable movement of the vanes, each gate having a face across which the vanes sweep during rotor rotation; said gates being shiftable toward and away from the vane-carrying member to vary the spacing therebetween; mechanism operatively connecting the vanes and gates to axially shift the vanes during relative angular travel through the raceway between the gates, and vary the length of stroke of the vanes while simultaneously and correspondingly varying the axial position of the gates with respect to the vane-carrying member; each gate face having an angular width sufficient to allow a vane to be constantly in fluid-sealing relation therewith during rotor rotation; fluid pressure operated counterbalancing actuator means operatively connected with each gate to counterbalance the axial thrust of fluid pressure in a raceway acting upon the gate face; and means establishing fluid pressure communication between said counterbalancing actuator means and the fluid pressure in the raceway acting upon the gate face at angularly spaced-apart intervals across the gate face as a vane sweeps the gate face, to progressively increase or decrease the fluid pressure counterbalancing thrust on the gate face.

18. The invention as defined in claim 17 characterized in that said fluid pressure operated counterbalancing actuator means comprises a plurality of fluid pressure actuators for each of the gates, and said means establishing fluid pressure communication comprises a plurality of passages in each gate opening at one end through the gate face at angularly spaced-apart intervals and each opening at the other end into one of the counterbalancing actuators associated with the gate, whereby upon movement of a vane across a gate face said passages are successively closed and opened in accordance with the angular travel of the vane thereby varying the total thrust of the counterbalancing actuator means of the gate in accordance with the relative areas of the gate face on opposite sides of the confronting vane.

19. The invention as defined in claim 17 characterized in that said fluid pressure operated counterbalancing actuator means include an actuator for each gate operative to oppose lateral thrust on the gate by fluid pressure in the raceway acting at a side of the gate.

20. In a fluid pressure power converter: a housing defining a rotor chamber; a rotor mounted for rotation in the chamber; a plurality of circumaxially arranged axially shiftable vanes mounted in the rotor and projecting beyond an end thereof; a plurality of circumaxially arranged axially shiftable gates at one end of the rotor chamber in opposition to the vanes and having faces across which the vanes sweep during rotor rotation; means operatively associated with the vanes to shift them axially during angular travel between the gates; an arm coupled to each gate and extending axially of the housing and provided with a cam follower; gate-shifting control mechanism connected with the cam follower of each arm to shift the arms, said control mechanism including cam means having parallel spaced-apart camming surfaces shiftable toward and away from each other and embracing opposite sides of each cam follower, said cam means shiftable relative to the cam followers to cause the followers to traverse the cam surfaces, means coupled with the cam means normally tensioning the cam surfaces against opposite sides of the followers to lock each follower and camming means against traverse movement, and said camming means including a subassembly for shifting apart the said camming surfaces to permit traverse of the camming surfaces across the cam followers to shift the arms.

References Cited in the file of this patent

UNITED STATES PATENTS

| | | |
|---|---|---|
| 1,276,372 | Johnson | Aug. 20, 1918 |
| 2,232,599 | Fehn | Feb. 18, 1941 |
| 2,434,590 | Runde | Jan. 13, 1948 |
| 2,439,448 | Buckner | Apr. 13, 1948 |
| 2,607,298 | Nicolas | Aug. 19, 1952 |
| 2,628,566 | Berner | Feb. 17, 1953 |
| 2,629,332 | Tripp | Feb. 24, 1953 |
| 2,633,710 | Jarmann | Apr. 7, 1953 |
| 2,687,012 | Glenn | Aug. 24, 1954 |
| 2,691,868 | Nicolas | Oct. 19, 1954 |

FOREIGN PATENTS

| | | |
|---|---|---|
| 566,126 | Great Britain | Dec. 14, 1944 |